(12) United States Patent
Ota et al.

(10) Patent No.: US 11,316,176 B2
(45) Date of Patent: Apr. 26, 2022

(54) ELECTROCHEMICAL REACTION UNIT AND ELECTROCHEMICAL REACTION CELL STACK

(71) Applicant: MORIMURA SOFC TECHNOLOGY CO., LTD., Komaki (JP)

(72) Inventors: Yuki Ota, Nagoya (JP); Takafumi Shichida, Nagoya (JP); Kenta Manabe, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 111 days.

(21) Appl. No.: 16/482,084

(22) PCT Filed: Nov. 6, 2017

(86) PCT No.: PCT/JP2017/039887
§ 371 (c)(1),
(2) Date: Jul. 30, 2019

(87) PCT Pub. No.: WO2018/142699
PCT Pub. Date: Aug. 9, 2018

(65) Prior Publication Data
US 2020/0251753 A1    Aug. 6, 2020

(30) Foreign Application Priority Data

Feb. 2, 2017    (JP) .............................. JP2017-017369

(51) Int. Cl.
*H01M 8/0265* (2016.01)
*H01M 8/2483* (2016.01)
*H01M 8/12* (2016.01)

(52) U.S. Cl.
CPC ........... *H01M 8/0265* (2013.01); *H01M 8/12* (2013.01); *H01M 8/2483* (2016.02)

(58) Field of Classification Search
CPC ..... H01M 8/0265; H01M 8/2483; H01M 8/12
See application file for complete search history.

(56) References Cited

U.S. PATENT DOCUMENTS 5,565,072 A   10/1996  Faita et al.
9,123,936 B2 * 9/2015  Hayashi .............. H01M 8/0273
(Continued)

FOREIGN PATENT DOCUMENTS

| JP | 2016-194995 A | 11/2016 |
| JP | 2016-207270 A | 12/2016 |
| WO | 2013/156075 A1 | 10/2013 |

OTHER PUBLICATIONS

International Search Report (PCT/ISA/210) dated Dec. 26, 2017 issued by the International Searching Authority in International Application No. PCT/JP2017/039887.
(Continued)

*Primary Examiner* — Ula C Ruddock
*Assistant Examiner* — Thomas H. Parsons
(74) *Attorney, Agent, or Firm* — Sughrue Mion, PLLC

(57) ABSTRACT

To prevent a reduction in the performance of a unit cell due to a gas shortage in a cathode chamber. An electrochemical reaction unit includes a unit cell, a cathode-side member, and an anode-side member. The electrochemical reaction unit satisfies the following condition on at least one of supply and discharge sides of the cathode chamber. Condition: the distance between the midpoint between opposite end points of a cathode-side opening group including an opening of a cathode-side communication channel and the midpoint (specific point) between opposite end points of an anode-side supply opening group including an opening of an anode-side supply communication channel in a direction parallel to an inner circumferential surface of a cathode chamber hole is shorter than the distance between the centroid of a cathode-side gas channel hole and the specific
(Continued)

point in the direction parallel to the inner circumferential surface of the cathode chamber hole.

4 Claims, 15 Drawing Sheets

(56) References Cited

U.S. PATENT DOCUMENTS 10,581,106 B2 * 3/2020 Brown ................ H01M 8/2425
2019/0051919 A1 2/2019 Yoshizaki et al.

OTHER PUBLICATIONS

Communication dated Nov. 26, 2020 from the European Patent Office in application No. 17895058.0.

* cited by examiner

ELECTROCHEMICAL REACTION UNIT AND ELECTROCHEMICAL REACTION CELL STACK

CROSS REFERENCE TO RELATED APPLICATIONS

This application is a National Stage of International Application No. PCT/JP2017/039887 filed Nov. 6, 2017, claiming priority based on Japanese Patent Application No. 2017-017369 filed Feb. 2, 2017.

TECHNICAL FIELD

A technique disclosed in the present description relates to an electrochemical reaction unit.

BACKGROUND ART

One known fuel cell that generates electricity by using an electrochemical reaction of hydrogen and oxygen is a solid oxide fuel cell (hereinafter referred to as an "SOFC"). A fuel cell electricity generation unit (hereinafter referred to as an "electricity generation unit"), which is a structural unit of an SOFC, includes a fuel cell unit cell (hereinafter referred to as a "unit cell"). The unit cell includes an electrolyte layer and further includes a cathode and an anode that face each other in a prescribed direction (hereinafter referred to a "first direction") with the electrolyte layer therebetween (see, for example, Patent Document 1).

The electricity generation unit includes a cathode-side member (hereinafter referred to as a "cathode-side frame") having a cathode chamber hole that forms a cathode chamber to which the cathode is facing. A cathode-side gas supply channel hole and a cathode-side gas discharge channel hole are formed in the cathode-side frame. The cathode-side gas supply channel hole forms a cathode-side gas supply channel (hereinafter referred to as an "oxidant gas introduction manifold") through which gas to be supplied to the cathode chamber (the gas is hereinafter referred to as "oxidant gas") flow. The cathode-side gas discharge channel hole forms a cathode-side gas discharge channel (hereinafter referred to as an "oxidant gas discharge manifold") through which gas discharged from the cathode chamber (hereinafter referred to as "oxidant off-gas") flows. A cathode-side supply communication channel and a cathode-side discharge communication channel are further formed in the cathode-side frame. The cathode-side supply communication channel is in communication with the cathode-side gas supply channel hole and has an opening at a first inner circumferential surface of the cathode chamber hole. The cathode-side discharge communication channel is in communication with the cathode-side gas discharge channel hole and has an opening at a second inner circumferential surface of the cathode chamber hole (the second inner circumferential surface faces the first inner circumferential surface in a direction orthogonal to the first direction). The oxidant gas is supplied to the cathode chamber of the electricity generation unit through the oxidant gas introduction manifold and the cathode-side supply communication channel. The oxidant off-gas discharged from the cathode chamber is discharged to the outside through the cathode-side discharge communication channel and the oxidant gas discharge manifold.

Moreover, the electricity generation unit includes an anode-side member (hereinafter referred to as an "anode-side frame") having an anode chamber hole that forms an anode chamber to which the anode is facing. An anode-side gas supply channel hole and an anode-side gas discharge channel hole are formed in the anode-side frame. The anode-side gas supply channel hole forms an anode-side gas supply channel (hereinafter referred to as a "fuel gas introduction manifold") through which gas to be supplied to the anode chamber (hereinafter referred to as "fuel gas") flows. The anode-side gas discharge channel hole forms an anode-side gas discharge channel (hereinafter referred to as a "fuel gas discharge manifold") through which gas discharged from the anode chamber (hereinafter referred to as "fuel off-gas") flows. An anode-side supply communication channel and an anode-side discharge communication channel are further formed in the anode-side frame. The anode-side supply communication channel is in communication with the anode-side gas supply channel hole and has an opening at a first inner circumferential surface of the anode chamber hole. The anode-side discharge communication channel is in communication with the anode-side gas discharge channel hole and has an opening at a second inner circumferential surface of the anode chamber hole (the second inner circumferential surface faces the first inner circumferential surface in a direction orthogonal to the first direction). The fuel gas is supplied to the anode chamber of the electricity generation unit through the fuel gas introduction manifold and the anode-side supply communication channel. The fuel off-gas discharged from the anode chamber is discharged to the outside through the anode-side discharge communication channel and the fuel gas discharge manifold.

PRIOR ART DOCUMENT

Patent Document

Patent Document 1: Japanese Patent Application Laid-Open (kokai) No. 2016-207270

SUMMARY OF THE INVENTION

Problems to be Solved by the Invention

Generally, during operation of the SOFC, the amount of the fuel gas supplied tends to be smaller than the amount of the oxidant gas supplied, in order to improve the use efficiency of the fuel gas. Therefore, in the electricity generation unit having the conventional structure, the power generation reaction occurs concentratedly in a region near the opening of the anode-side supply communication channel within the unit cell, when the electricity generation unit is viewed in the first direction. In this case, a large amount of the oxidant gas is consumed in this region, and this may cause a shortage of the oxidant gas, so that the power generation performance of the unit cell may deteriorate. A conceivable method of solving such a problem is, for example, adjusting the position of the oxidant gas introduction manifold and the position of the oxidant gas discharge manifold. However, the design flexibility in terms of the positions of the manifolds is low because interference between the manifolds and fastening members must be avoided. In many cases, the problem cannot be solved by simply adjusting the positions of the manifolds.

The above problem also occurs in an electrolysis cell unit, which is a structural unit of a solid oxide electrolysis cell (hereinafter referred to as an "SOEC") that generates hydrogen using electrolysis of water. In the present description, the fuel cell electricity generation unit and the electrolysis cell unit are collectively referred to as an electrochemical reaction unit. The above problem occurs not only in SOFCs and SOECs but also in other types of electrochemical reaction units.

The present description discloses a technique that can solve the above problem.

Means for Solving the Problems

The technique disclosed in the present description can be embodied, for example, in the following modes.

(1) An electrochemical reaction unit disclosed in the present description comprises: a unit cell including an electrolyte layer and further including a cathode and an anode that face each other in a first direction with the electrolyte layer therebetween; a cathode-side member having a cathode chamber hole that forms a cathode chamber to which the cathode is facing and that has a first inner circumferential surface and a second inner circumferential surface facing each other in a second direction orthogonal to the first direction, a cathode-side gas supply channel hole that forms a cathode-side gas supply channel through which gas to be supplied to the cathode chamber flows, a cathode-side gas discharge channel hole that forms a cathode-side gas discharge channel through which gas discharged from the cathode chamber flows, at least one cathode-side supply communication channel that is in communication with the cathode-side gas supply channel hole and has an opening at the first inner circumferential surface of the cathode chamber hole, and at least one cathode-side discharge communication channel that is in communication with the cathode-side gas discharge channel hole and has an opening at the second inner circumferential surface of the cathode chamber hole; and an anode-side member having an anode chamber hole that has a third inner circumferential surface and forms an anode chamber to which the anode is facing, an anode-side gas supply channel hole that forms an anode-side gas supply channel through which gas to be supplied to the anode chamber flows, and at least one anode-side supply communication channel that is in communication with the anode-side gas supply channel hole and has an opening at the third inner circumferential surface of the anode chamber hole, wherein, in a contour of the cathode chamber hole as viewed in the first direction, a portion defined by the first inner circumferential surface includes a first straight portion, and a portion defined by the second inner circumferential surface includes a second straight portion, and wherein the electrochemical reaction unit satisfies at least one of a first condition and a second condition, the first condition being that, when the electrochemical reaction unit is viewed in the first direction, a distance Lsi between a first point and a second point in a direction parallel to the first straight portion is shorter than a distance Lmi between the second point and a third point in the direction parallel to the first straight portion, the first point being the midpoint between opposite end points of a cathode-side supply opening group including the opening of the at least one cathode-side communication channel at the first inner circumferential surface, the second point being the midpoint between opposite end points of an anode-side supply opening group including all the opening of the at least one anode-side supply communication channel at the third inner circumferential surface, the third point being the centroid of the cathode-side gas supply channel hole, the second condition being that, when the electrochemical reaction unit is viewed in the first direction, a distance Lso between the second point and a fourth point in a direction parallel to the second straight portion is shorter than a distance Lmo between the second point and a fifth point in the direction parallel to the second straight portion, the fourth point being the midpoint between opposite end points of a cathode-side discharge opening group including the opening of the at least one cathode-side discharge communication channel at the second inner circumferential surface, the fifth point being the centroid of the cathode-side gas discharge channel hole. The electrochemical reaction unit satisfies at least one of the condition that the distance Lsi is shorter than the distance Lmi and the condition that the distance Lso is shorter than the distance Lmo. In other words, when viewed in the first direction, the cathode-side supply communication channel extends from the cathode-side gas supply channel hole forming the cathode-side gas supply channel in a direction inclined toward the opening of the anode-side supply communication channel at the third inner circumferential surface, and/or the cathode-side discharge communication channel extends from the cathode-side gas discharge channel hole forming the cathode-side gas discharge channel in a direction inclined toward the opening of the anode-side supply communication channel at the third inner circumferential surface. In this structure, the supply of gas to a region in which the reaction in the cathode chamber tends to occur concentratedly, i.e., a region close to the opening of the anode-side supply communication channel at the third inner circumferential surface when the electrochemical reaction unit is viewed in the first direction, is facilitated, so that a gas shortage in this region can be prevented. Therefore, in this electrochemical reaction unit, a reduction in the performance of the unit cell due to a gas shortage in the cathode chamber can be prevented.

(2) The above-described electrochemical reaction unit may satisfy both the first condition and the second condition. In this electrochemical reaction unit, the supply of gas to the region in which the reaction in the cathode chamber tends to occur concentratedly is facilitated effectively, so that the gas shortage in this region can be prevented effectively. Therefore, in the electrochemical reaction unit, the reduction in the performance of the unit cell due to the gas shortage in the cathode chamber can be prevented effectively.

(3) The above-described electrochemical reaction unit may satisfy at least one of a third condition and a fourth condition, the third condition being that, when the electrochemical reaction unit is viewed in the first direction, the angle between a first virtual line connecting the first point to the third point and a second virtual line connecting the second point to the third point is 10° or less, the fourth condition being that, when the electrochemical reaction unit is viewed in the first direction, the angle between a third virtual line connecting the fourth point to the fifth point and a fourth virtual line connecting the second point to the fifth point is 10° or less. In this electrochemical reaction unit, the supply of gas to the region in which the reaction in the cathode chamber tends to occur concentratedly is facilitated more effectively, so that the gas shortage in this region can be prevented more effectively. Therefore, in the electrochemical reaction unit, the reduction in the performance of the unit cell due to the gas shortage in the cathode chamber can be prevented more effectively.

(4) The above-described electrochemical reaction unit may satisfy both the third condition and the fourth condition. In this electrochemical reaction unit, the supply of gas to the region in which the reaction in the cathode chamber tends to occur concentratedly is facilitated extremely effectively, so that the gas shortage in this region can be prevented extremely effectively. Therefore, in the electrochemical reaction unit, the reduction in the performance of the unit cell due to the gas shortage in the cathode chamber can be prevented extremely effectively.

(5) In the above-described electrochemical reaction unit, the unit cell may be a fuel cell unit cell.

In this electrochemical reaction unit, the reduction in the power generation performance of the unit cell due to the gas shortage in the cathode chamber can be prevented effectively.

The technique disclosed in the present description can be embodied in various forms. For example, the technique can be embodied in the form of an electrochemical reaction unit (a fuel cell electricity generation unit or an electrolysis cell unit), in the form of an electrochemical reaction cell stack (a fuel cell stack or an electrolysis cell stack) including a plurality of electrochemical reaction units, and in the form of a method for producing them.

MODES FOR CARRYING OUT THE INVENTION

A. Embodiment

A-1. Apparatus Structure (Structure of Fuel Cell Stack 100)

Figure 1:
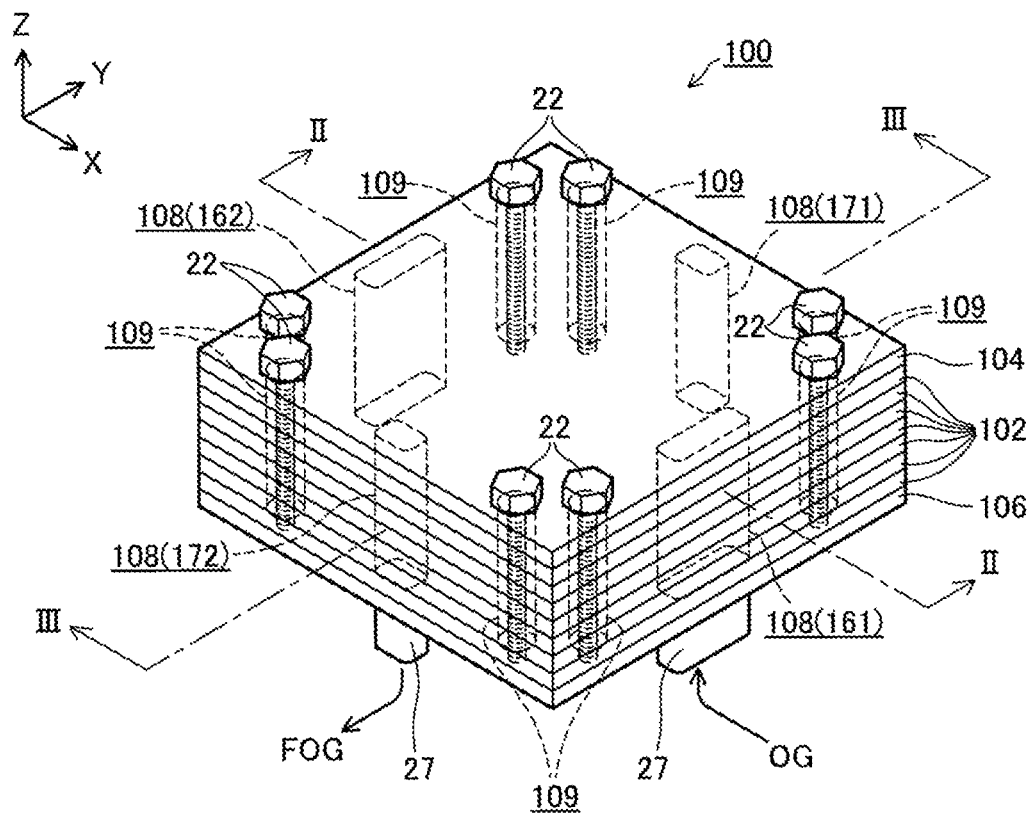
FIG. 1 is a perspective view showing an external structure of a fuel cell stack 100 of an embodiment.
Figure 2:
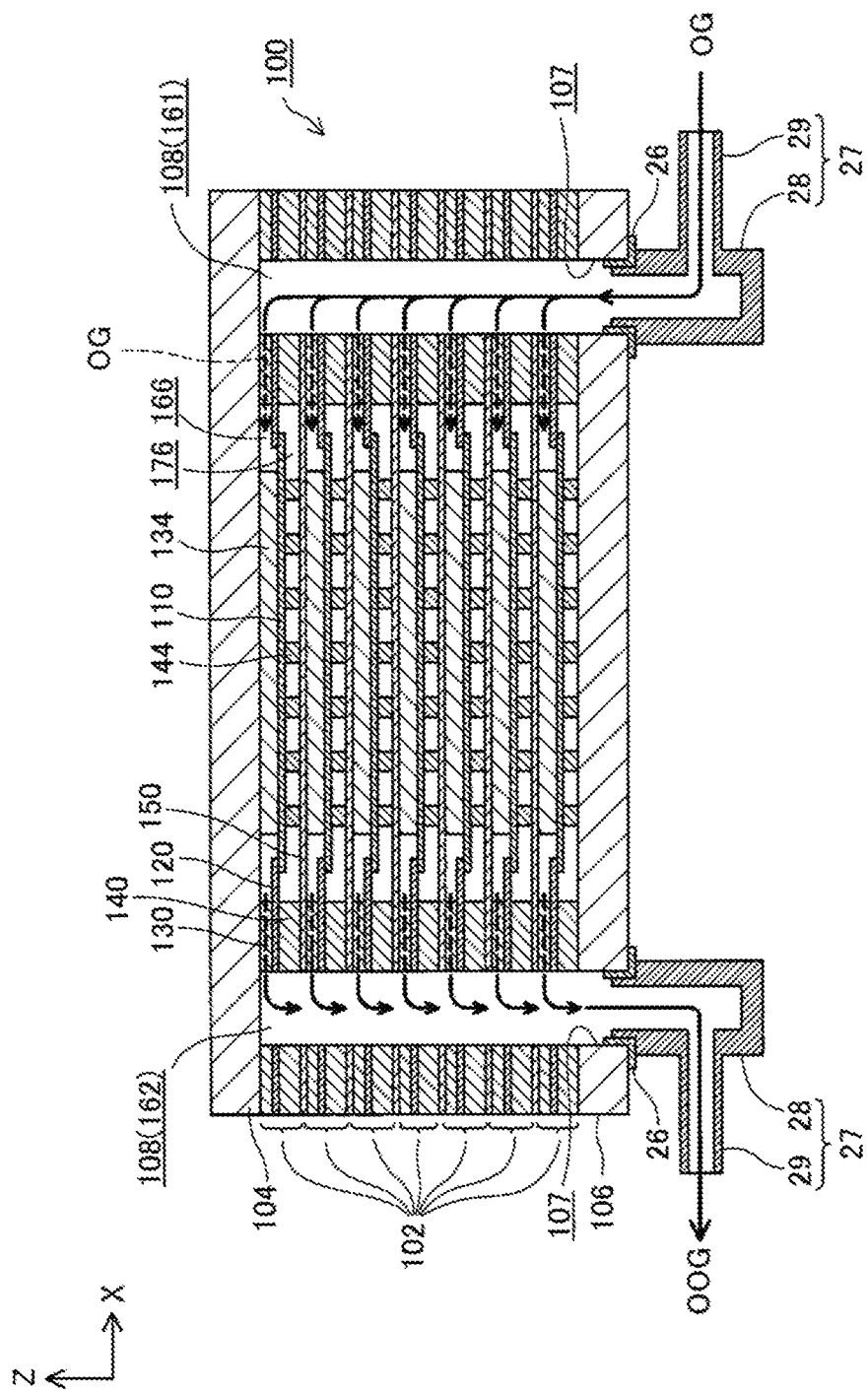
FIG. 2 is an explanatory view showing an XZ cross-sectional structure of the fuel cell stack 100 at a position indicated by II-II in FIG. 1.
Figure 3:
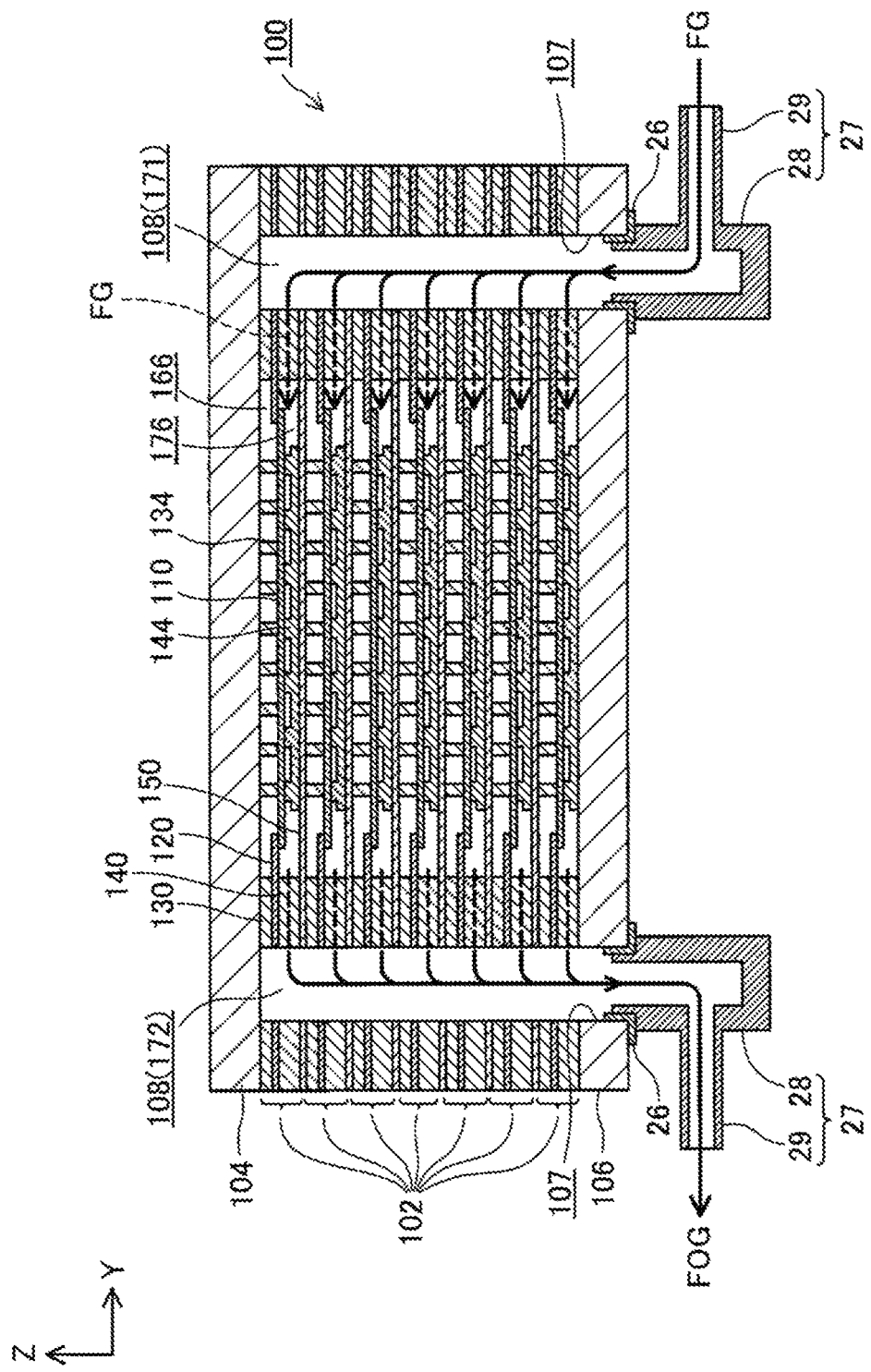
FIG. 3 is an explanatory view showing a YZ cross-sectional structure of the fuel cell stack 100 at a position indicated by in FIG. 1.

FIG. 1 is a perspective view showing an external structure of a fuel cell stack 100 of an embodiment. FIG. 2 is an explanatory view showing an XZ cross-sectional structure of the fuel cell stack 100 at a position indicated by II-II in FIG. 1, and FIG. 3 is an explanatory view showing a YZ cross-sectional structure of the fuel cell stack 100 at a position indicated by III-III in FIG. 1. Mutually orthogonal X, Y, and Z axes for designating directions are shown in these figures. In the present description, a positive Z-axis direction is referred to as an upward direction, and a negative Z-axis direction is referred to as a downward direction, for the sake of convenience. However, in practice, the fuel cell stack 100 may be oriented differently. The same applies to FIG. 4 and subsequent figures.

The fuel cell stack 100 includes a plurality of (seven in the present embodiment) fuel cell electricity generation units (hereinafter referred to simply as "electricity generation units") 102 and a pair of end plates 104 and 106. The seven electricity generation units 102 are arranged in a prescribed arrangement direction (the vertical direction in the present embodiment). The pair of end plates 104 and 106 are disposed so as to sandwich the assembly of the seven electricity generation units 102 in the vertically direction. The arrangement direction (the vertical direction) corresponds to the first direction in the claims.

As shown in FIG. 1, each of the layers (the electricity generation units 102 and the end plates 104 and 106) forming the fuel cell stack 100 has holes which are formed near four peripheral corners thereof about the Z-axis direction and extend therethrough in the vertical direction. A series of holes formed in these layers and corresponding to one another are in communication with one another in the vertical direction and form a bolt hole 109 that extends in the vertical direction from the end plate 104 to the end plate 106. In the present embodiment, eight bolt holes 109 are formed in the fuel cell stack 100. Bolts 22 are inserted into the bolt holes 109, and the fuel cell stack 100 is clamped with the bolts 22 and unillustrated nuts.

As shown in FIGS. 1 to 3, each electricity generation unit 102 has holes which are formed near the midpoints of peripheral sides about the Z-axis direction and extend therethrough in the vertical direction. A series of holes formed in the electricity generation units 102 and corresponding to one another are in communication with one another in the vertical direction and form a communication hole 108 extending across the plurality of electricity generation units 102 in the vertical direction. In the following description, the holes formed in the electricity generation units 102 to form the communication holes 108 may also be referred to as the communication holes 108.

As shown in FIGS. 1 and 2, a communication hole 108 located near the midpoint of one of the peripheral sides of the fuel cell stack 100 about the Z-axis direction (one of two sides parallel to the Y-axis that is on the positive side in the X-axis direction) serves as an oxidant gas introduction manifold 161 that is a common gas channel into which oxidant gas OG is introduced from the outside of the fuel cell stack 100 and from which the oxidant gas OG is supplied to a cathode chamber 166, described later, of each electricity generation unit 102. A communication hole 108 located near the midpoint of the side opposite to the above side (one of the two sides parallel to the Y-axis that is on the negative side in the X-axis direction) serves as an oxidant gas discharge manifold 162 that is a common gas channel for discharging oxidant off-gas OOG, i.e., gas discharged from the cathode chamber 166 of each electricity generation unit 102, to the outside of the fuel cell stack 100. In the present embodiment, air, for example, is used as the oxidant gas OG. The oxidant gas introduction manifold 161 corresponds to the cathode-side gas supply channel in the claims, and the oxidant gas discharge manifold 162 corresponds to the cathode-side gas discharge channel in the claims.

As shown in FIGS. 1 and 3, a communication hole 108 located near the midpoint of one of the peripheral sides of the fuel cell stack 100 about the Z-axis direction (one of two sides parallel to the X-axis that is on the positive side in the Y-axis direction) serves as a fuel gas introduction manifold 171 that is a common gas channel into which fuel gas FG is introduced from the outside of the fuel cell stack 100 and from which the fuel gas FG is supplied to an anode chamber 176, described later, of each electricity generation unit 102. A communication hole 108 located near the midpoint of the side opposite to the above side (one of the two sides parallel to the X-axis that is on the negative side in the Y-axis direction) serves as a fuel gas discharge manifold 172 that is a common gas channel for discharging fuel off-gas FOG, i.e., gas discharged from the anode chamber 176 of each electricity generation unit 102, to the outside of the fuel cell stack 100. In the present embodiment, the fuel gas FG used is, for example, hydrogen-rich gas reformed from city gas. The fuel gas introduction manifold 171 corresponds to the anode-side gas supply channel in the claims.

(Structures of End Plates 104 and 106)

The pair of end plates 104 and 106 are approximately rectangular plate-shaped conductive members and made of, for example, stainless steel. The end plate 104 is disposed on the upper side of the uppermost electricity generation unit 102, and the end plate 106 is disposed on the lower side of the lowermost electricity generation unit 102. The plurality of electricity generation units 102 are pressed and held between the pair of end plates 104 and 106. The upper end plate 104 functions as a positive output terminal of the fuel cell stack 100, and the lower end plate 106 functions as a negative output terminal of the fuel cell stack 100. As shown in FIGS. 2 and 3, four channel through holes 107 are formed in the lower end plate 106. Each of the four channel through holes 107 is in communication with a corresponding one of the oxidant gas introduction manifold 161, the oxidant gas discharge manifold 162, the fuel gas introduction manifold 171, and the fuel gas discharge manifold 172.

(Structures of Gas Passage Members 27 etc.)

As shown in FIGS. 2 and 3, the fuel cell stack 100 further includes four gas passage members 27 disposed on the lower end plate 106 on the side opposite to the plurality of electricity generation units 102 (i.e., on the lower side). Each of the four gas passage members 27 is disposed in a position overlapping a corresponding one of the oxidant gas introduction manifold 161, the oxidant gas discharge manifold 162, the fuel gas introduction manifold 171, and the fuel gas discharge manifold 172 in the vertical direction. Each of the gas passage members 27 includes: a main body 28 having a hole in communication with a corresponding one of the channel through holes 107 of the lower end plate 106; and a tubular branched portion 29 branched from a side surface of the main body 28. The hole of the branched portion 29 is in communication with the hole of the main body 28. Gas pipes (not shown) are connected to the branched portions 29 of the gas passage members 27. An insulating sheet 26 is disposed between the end plate 106 and the main body 28 of each gas passage member 27. The insulating sheet 26 is formed of, for example, a mica sheet, a ceramic fiber sheet, a ceramic compact sheet, a glass sheet, or a glass-ceramic composite material.

(Structure of Electricity Generation Units 102)

Figure 4:
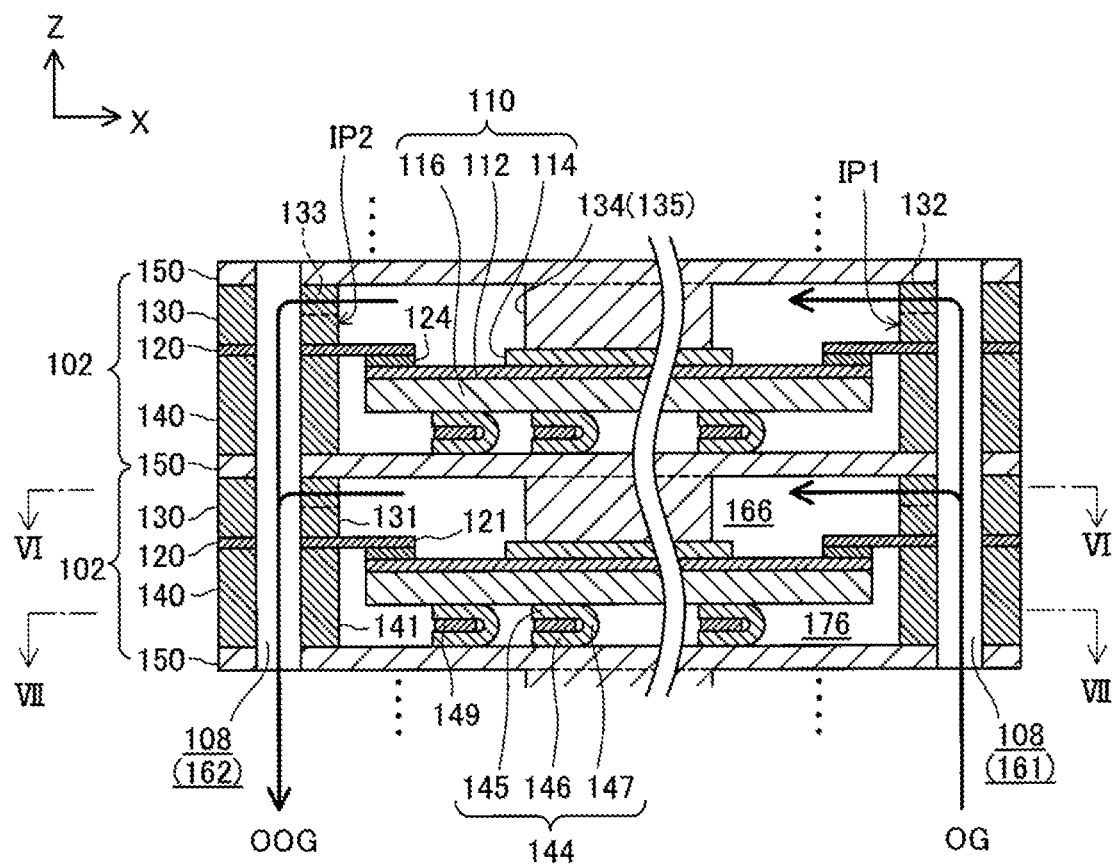
FIG. 4 is an explanatory view showing an XZ cross-sectional structure of two adjacent electricity generation units 102 at the same position as the cross section shown in FIG. 2.
Figure 5:
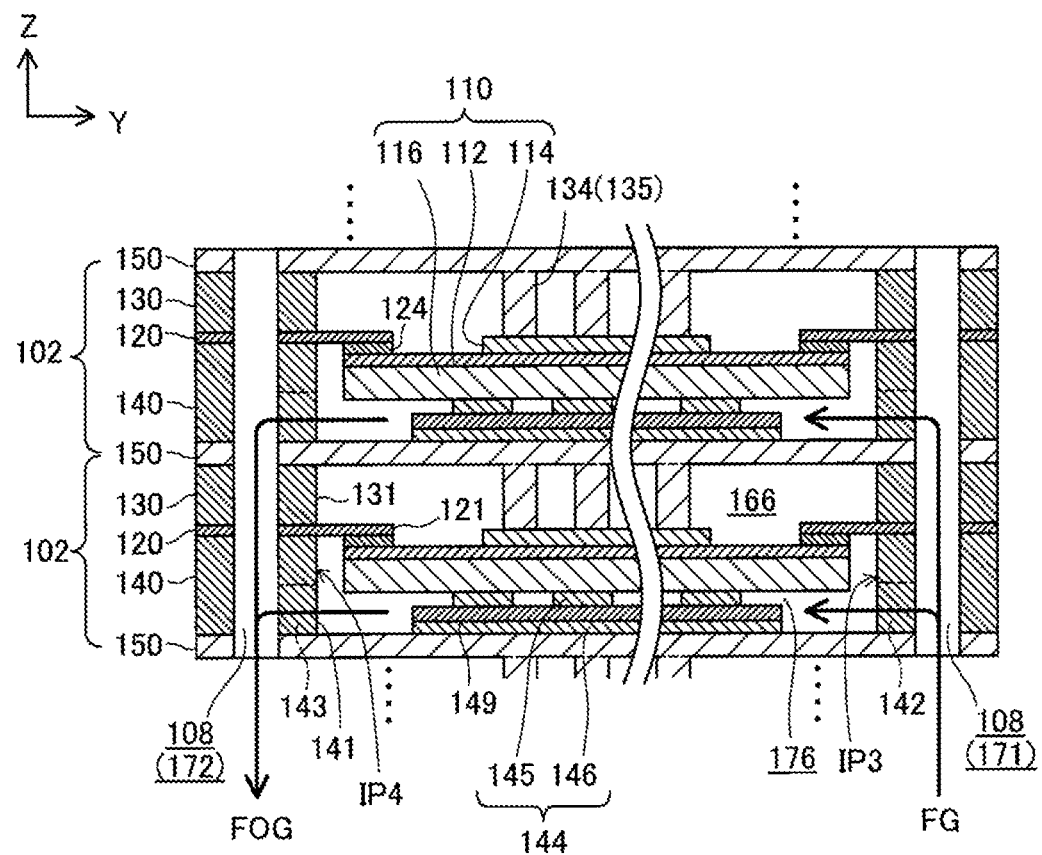
FIG. 5 is an explanatory view showing a YZ cross-sectional structure of two adjacent electricity generation units 102 at the same position as the cross section shown in FIG. 3.
Figure 6:
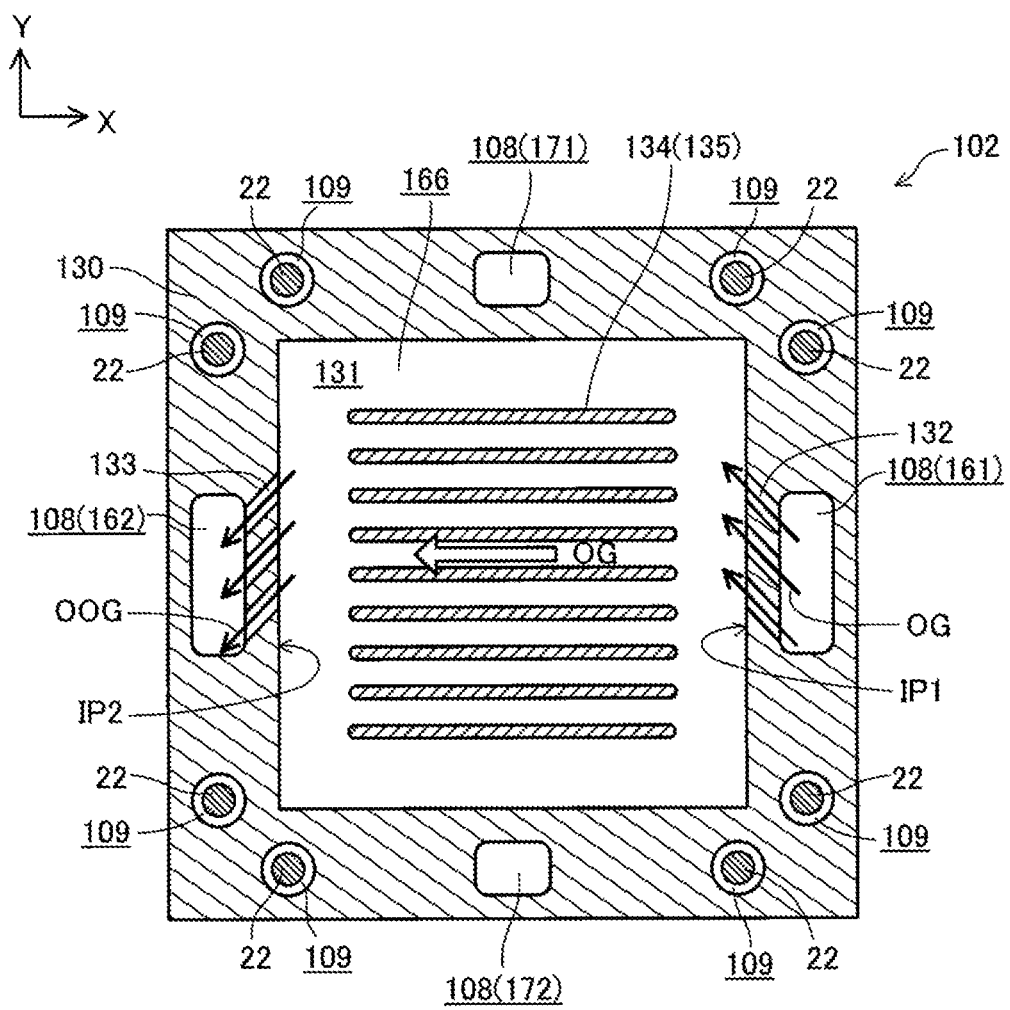
FIG. 6 is an explanatory view showing an XY cross-sectional structure of an electricity generation unit 102 at a position indicated by VI-VI in FIG. 4.
Figure 7:
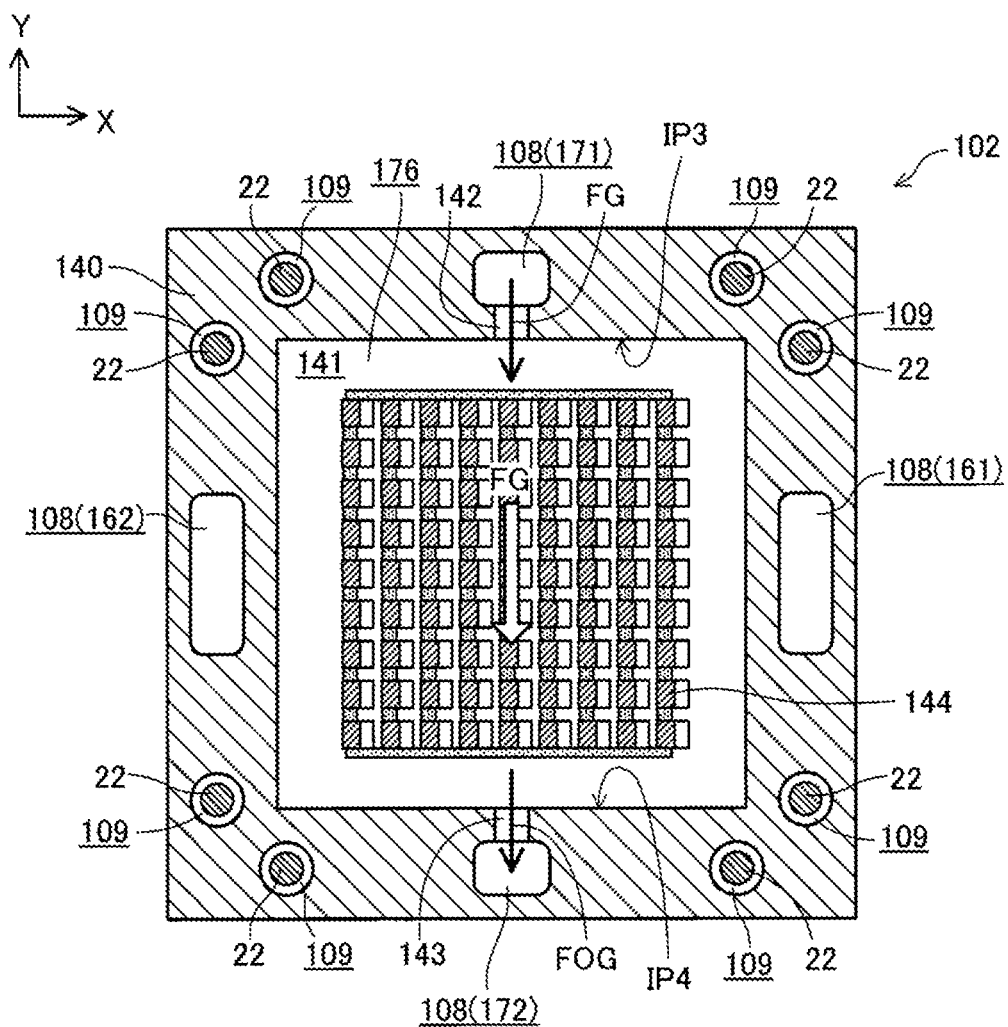
FIG. 7 is an explanatory view showing an XY cross-sectional structure of the electricity generation unit 102 at a position indicated by VII-VII in FIG. 4.

FIG. 4 is an explanatory view showing an XZ cross-sectional structure of two adjacent electricity generation units 102 at the same position as the cross section shown in FIG. 2, and FIG. 5 is an explanatory view showing a YZ cross-sectional structure of two adjacent electricity generation units 102 at the same position as the cross section shown in FIG. 3. FIG. 6 is an explanatory view showing an XY cross-sectional structure of an electricity generation unit 102 at a position indicated by VI-VI in FIG. 4, and FIG. 7 is an explanatory view showing an XY cross-sectional structure of the electricity generation unit 102 at a position indicated by VII-VII in FIG. 4.

As shown in FIGS. 4 and 5, each electricity generation unit 102 includes a unit cell 110, a separator 120, a cathode-side frame 130, a cathode-side current collector 134, an anode-side frame 140, an anode-side current collector 144, and a pair of interconnectors 150 serving as the uppermost and lowermost layers of the electricity generation unit 102. Holes constituting the communication holes 108 serving as the manifolds 161, 162, 171, and 172 and holes constituting the bolt holes 109 are formed in a peripheral edge portion, about the Z-axis direction, of each of the separator 120, the cathode-side frame 130, the anode-side frame 140, and the interconnectors 150.

Each interconnector 150 is an approximately rectangular flat plate-shaped conductive member and is formed of, for example, ferritic stainless steel. The interconnector 150 provides electrical continuity between adjacent electricity generation units 102 and prevents mixing of reaction gases in adjacent electricity generation units 102. In the present embodiment, when two electricity generation units 102 are disposed adjacent to each other, the electricity generation units 102 adjacent to each other share one interconnector 150. Specifically, the upper interconnector 150 of a certain electricity generation unit 102 serves also as the lower interconnector 150 of another electricity generation unit 102 adjacently located on the upper side of the certain electricity generation unit 102. The fuel cell stack 100 includes the pair of end plates 104 and 106. Therefore, the uppermost electricity generation unit 102 in the fuel cell stack 100 has no upper interconnector 150, and the lowermost electricity generation unit 102 has no lower interconnector 150 (see FIGS. 2 and 3).

Each unit cell 110 includes an electrolyte layer 112 and further includes a cathode 114 and an anode 116 that face each other in the vertical direction (the arrangement direction of the electricity generation units 102) with the electrolyte layer 112 therebetween. The unit cell 110 in the present embodiment is an anode-support-type unit cell in which the anode 116 supports the electrolyte layer 112 and the cathode 114.

The electrolyte layer 112 is an approximately rectangular flat plate-shaped member when viewed in the Z-axis direction and is a dense layer. The electrolyte layer 112 is formed of a solid oxide such as YSZ (yttria-stabilized zirconia), ScSZ (scandia-stabilized zirconia), SDC (samarium-doped ceria), GDC (gadolinium-doped ceria), or a perovskite-type oxide. The cathode 114 is an approximately rectangular flat plate-shaped member smaller than the electrolyte layer 112 when viewed in the Z-axis direction and is a porous layer. The cathode 114 is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is an approximately rectangular flat plate-shaped member having approximately the same size as the electrolyte layer 112 when viewed in the Z-axis direction and is a porous layer. The anode 116 is formed of, for example, a cermet composed of Ni and oxide ion conductive ceramic particles (e.g., YSZ particles). As described above, each unit cell 110 (each electricity generation unit 102) in the present embodiment is a solid oxide fuel cell (SOFC) that uses a solid oxide as the electrolyte.

The separator 120 is a frame-shaped member that has an approximately rectangular hole 121 formed in a central region thereof and passing therethrough in the vertical direction and is formed of, for example, a metal. A portion of the separator 120 located around the hole 121 faces a peripheral edge portion of a surface of the electrolyte layer 112, which surface is located on the cathode 114 side. The separator 120 is bonded to the electrolyte layer 112 (the unit cell 110) through a bonding member 124 formed of a brazing material (e.g., Ag solder) and disposed on a portion of the separator 120 that faces the electrolyte layer 112. The separator 120 separates the cathode chamber 166 to which the cathode 114 is facing from the anode chamber 176 to which the anode 116 is facing, and gas leakage from one electrode side to the other electrode side in the peripheral edge portion of the unit cell 110 is thereby prevented.

The cathode-side frame 130 is a frame-shaped member having an approximately rectangular hole 131 formed in a central region thereof and passing therethrough in the vertical direction and is formed of, for example, an insulator such as mica. The cathode-side frame 130 is in contact with a peripheral edge portion of a surface of the separator 120, which surface is located on the side opposite the electrolyte layer 112 and with a peripheral edge portion of a surface of one of the interconnectors 150, which surface is located on the side toward the cathode 114. The cathode-side frame 130 electrically insulates the pair of interconnectors 150 included in the electricity generation unit 102 from each other.

As shown in FIGS. 4 and 6, the hole 131 of the cathode-side frame 130 forms the cathode chamber 166 to which the cathode 114 is facing. The hole 131 has a first inner circumferential surface IP1 and a second inner circumferential surface IP2 that face each other in the X-axis direction. As shown in FIG. 6, in a contour of the hole 131 when it is viewed in the Z-axis direction, a portion defined by the first inner circumferential surface IP1 and a portion defined by the second inner circumferential surface IP2 are entirely straight. As shown in FIGS. 4 and 6, oxidant gas supply communication channels 132 and oxidant gas discharge communication channels 133 are formed in the cathode-side frame 130. Each oxidant gas supply communication channel 132 is in communication with one of the communication holes 108 that forms the oxidant gas introduction manifold 161 and has an opening at the first inner circumferential surface IP1 of the hole 131 forming the cathode chamber 166. Each oxidant gas discharge communication channel 133 is in communication with one of the communication holes 108 that forms the oxidant gas discharge manifold 162 and has an opening at the second inner circumferential surface IP2 of the hole 131 forming the cathode chamber 166. In the present embodiment, three oxidant gas supply communication channels 132 and three oxidant gas discharge communication channels 133 are formed in the cathode-side frame 130.

The cathode-side frame 130 corresponds to the cathode-side member in the claims, and the hole 131 corresponds to the cathode chamber hole in the claims. One of the communication holes 108 that is formed in the cathode-side frame 130 and forms the oxidant gas introduction manifold 161 corresponds to the cathode-side gas supply channel hole in the claims, and one of the communication holes 108 that is formed in the cathode-side frame 130 and forms the oxidant gas discharge manifold 162 corresponds to the cathode-side gas discharge channel hole in the claims. The oxidant gas supply communication channels 132 each correspond to the cathode-side supply communication channel in the claims, and the oxidant gas discharge communication channels 133 each correspond to the cathode-side discharge communication channel in the claims. The X-axis direction corresponds to the second direction in the claims. The straight portion of the contour of the hole 131 that is defined by the first inner circumferential surface IP1 corresponds to the first straight portion in the claims, and the straight portion of the contour of the hole 131 that is defined by the second inner circumferential surface IP2 corresponds to the second straight portion in the claims.

The anode-side frame 140 is a frame-shaped member having an approximately rectangular hole 141 formed in a central region thereof and passing therethrough in the vertical direction and is formed of, for example, a metal. The anode-side frame 140 is in contact with a peripheral edge portion of a surface of the separator 120, which surface is located on the side toward the electrolyte layer 112 and with a peripheral edge portion of a surface of one of the interconnectors 150, which surface is located on the side toward the anode 116.

As shown in FIGS. 5 and 7, the hole 141 of the anode-side frame 140 forms the anode chamber 176 to which the anode 116 is facing. The hole 141 has a third inner circumferential surface IP3 and a fourth inner circumferential surface IP4 that face each other in the Y-axis direction. As shown in FIG. 7, in a contour of the hole 141 when it is viewed in the Z-axis direction, a portion defined by the third inner circumferential surface IP3 and a portion defined by the fourth inner circumferential surface IP4 are entirely straight. As shown in FIGS. 5 and 7, a fuel gas supply communication channel 142 and a fuel gas discharge communication channel 143 are formed in the anode-side frame 140. The fuel gas supply communication channel 142 is in communication with one of the communication holes 108 that forms the fuel gas introduction manifold 171 and has an opening at the third inner circumferential surface IP3 of the hole 141 forming the anode chamber 176. The fuel gas discharge communication channel 143 is in communication with one of the communication holes 108 that forms the fuel gas discharge manifold 172 and has an opening at the fourth inner circumferential surface IP4 of the hole 141 forming the anode chamber 176. In the present embodiment, one fuel gas supply communication channel 142 and one fuel gas discharge communication channel 143 are formed in the anode-side frame 140.

The anode-side frame 140 corresponds to the anode-side member in the claims, and the hole 141 corresponds to the anode chamber hole in the claims. The communication hole 108 formed in the anode-side frame 140 and forming the fuel gas introduction manifold 171 corresponds to the anode-side gas supply channel hole in the claims, and the fuel gas supply communication channel 142 corresponds to the anode-side supply communication channel in the claims.

As shown in FIGS. 4 to 6, in each electricity generation unit 102, the cathode-side current collector 134 is disposed in the cathode chamber 166. The cathode-side current collector 134 includes a plurality of approximately quadrangular prism-shaped current collector elements 135 and is formed of, for example, ferritic stainless steel. The cathode-side current collector 134 is in contact with a surface of the cathode 114 that is opposite to its surface facing the electrolyte layer 112 and with a surface of one of the interconnectors 150 that faces the cathode 114. However, as described above, since the uppermost electricity generation unit 102 in the fuel cell stack 100 does not have the upper interconnector 150, the cathode-side current collector 134 of the uppermost electricity generation unit 102 is in contact with the upper end plate 104. The cathode-side current collector 134 having the above-described structure electrically connects the cathode 114 to one of the interconnectors 150 (or the end plate 104). In the present embodiment, the cathode-side current collector 134 and the one of the interconnectors 150 are formed as an integrated member. Specifically, in the integrated member, a flat plate-shaped portion orthogonal to the vertical direction (the Z-axis direction) serves as the interconnector 150, and the current collector elements 135 that are a plurality of protrusions formed so as to protrude from the flat plate-shaped portion toward the cathode 114 serve as the cathode-side current collector 134. The integrated member composed of the cathode-side current collector 134 and the interconnector 150 may be coated with an electrically conductive coating, and an electrically conductive junction layer may be interposed between the cathode 114 and the cathode-side current collector 134 so as to loin them together.

As shown in FIGS. 4, 5, and 7, in each electricity generation unit 102, the anode-side current collector 144 is disposed in the anode chamber 176. The anode-side current collector 144 includes interconnector-facing portions 146, electrode-facing portions 145, and connecting portions 147 that connect the electrode-facing portions 145 to the interconnector-facing portions 146 and is formed of, for example, nickel, a nickel alloy, or stainless steel. The electrode-facing portions 145 are in contact with a surface of the anode 116 that is opposite to its surface facing the electrolyte layer 112, and the interconnector-facing portions 146 are in contact with a surface of one of the interconnectors 150 that faces the anode 116. However, as described above, since the lowermost electricity generation unit 102 in the fuel cell stack 100 does not include the lower interconnector 150, the interconnector-facing portions 146 of the lowermost electricity generation unit 102 are in contact with the lower end plate 106. The anode-side current collector 144 having the above-described structure electrically connects the anode 116 to one of the interconnectors 150 (or the end plate 106). Spacers 149 formed of, for example, mica are disposed between the electrode-facing portions 145 and the interconnector-facing portions 146. Therefore, the anode-side current collector 144 follows the deformation of the electricity generation unit 102 that is caused by temperature cycles or fluctuations in reaction gas pressure, and a good electrical connection is maintained between the anode 116 and the interconnector 150 (or the end plate 106) through the anode-side current collector 144.

A-2. Operation of Fuel Cell Stack 100

As shown in FIGS. 2, 4, and 6, when the oxidant gas OG is supplied through a gas tube (not shown) connected to the branched portion 29 of one of the gas passage members 27 that is disposed at a position corresponding to the oxidant gas introduction manifold 161, the oxidant gas OG flows through the branched portion 29 and the main body 28 of the gas passage member 27 and through one of the channel through holes 107 of the lower end plate 106, and is then supplied to the oxidant gas introduction manifold 161. The oxidant gas OG is then supplied from the oxidant gas introduction manifold 161 through the oxidant gas supply communication channels 132 of each electricity generation unit 102 to its cathode chamber 166. As shown in FIGS. 3, 5, and 7, when the fuel gas FG is supplied through a gas tube (not shown) connected to the branched portion 29 of one of the gas passage members 27 that is disposed at a position corresponding to the fuel gas introduction manifold 171, the fuel gas FG flows through the branched portion 29 and the main body 28 of the gas passage member 27 and through one of the channel through holes 107 of the lower end plate 106, and is then supplied to the fuel gas introduction manifold 171. The fuel gas FG is then supplied from the fuel gas introduction manifold 171 through the fuel gas supply communication channel 142 of each electricity generation unit 102 to its anode chamber 176.

When the oxidant gas OG is supplied to the cathode chamber 166 of each electricity generation unit 102 and the fuel gas FG is supplied to its anode chamber 176, oxygen contained in the oxidant gas OG and hydrogen contained in the fuel gas FG undergo an electrochemical reaction in the unit cell 110, and electric power is thereby generated. This power generation reaction is an exothermic reaction. In each electricity generation unit 102, the cathode 114 of the unit cell 110 is electrically connected to one of the interconnectors 150 through the cathode-side current collector 134, and the anode 116 is electrically connected to the other one of the interconnectors 150 through the anode-side current collector 144. The plurality of electricity generation units 102 included in the fuel cell stack 100 are electrically connected in series. Therefore, electric energy generated in the electricity generation units 102 is outputted from the end plates 104 and 106 of the fuel cell stack 100 that serve as output terminals. In the SOFC, since the electric power is generated at a relatively high temperature (e.g., 700° C. to 1,000° C.), the fuel cell stack 100 may be heated by a heater (not shown) after startup until heat generated by power generation can maintain the high temperature.

As shown in FIGS. 2, 4, and 6, the oxidant off-gas COG discharged from the cathode chamber 166 of each electricity generation unit 102 is discharged to the oxidant gas discharge manifold 162 through the oxidant gas discharge communication channels 133, passes through one of the channel through holes 107 in the lower end plate 106 and through the main body 28 and the branched portion 29 of one of the gas passage members 27 that is disposed at a position corresponding to the oxidant gas discharge manifold 162, and is then discharged to the outside of the fuel cell stack 100 through a gas tube (not shown) connected to the branched portion 29. As shown in FIGS. 3, 5, and 7, the fuel off-gas FOG discharged from the anode chamber 176 of each electricity generation unit 102 is discharged through the fuel gas discharge communication channel 143 to the fuel gas discharge manifold 172, passes through one of the channel through holes 107 in the lower end plate 106 and through the main body 28 and the branched portion 29 of one of the gas passage members 27 that is disposed at a position corresponding to the fuel gas discharge manifold 172, and is then discharged to the outside of the fuel cell stack 100 through a gas tube (not shown) connected to the branched portion 29.

The fuel cell stack 100 (each electricity generation unit 102) of the present embodiment is a cross-flow SOFC in which the direction of the flow of the oxidant gas OG in each electricity generation unit 102 is approximately orthogonal to the direction of the flow of the fuel gas FG in the electricity generation unit 102.

A-3. Specific Structures of Flow Channels Formed in Electricity Generation Units 102

Figure 8:
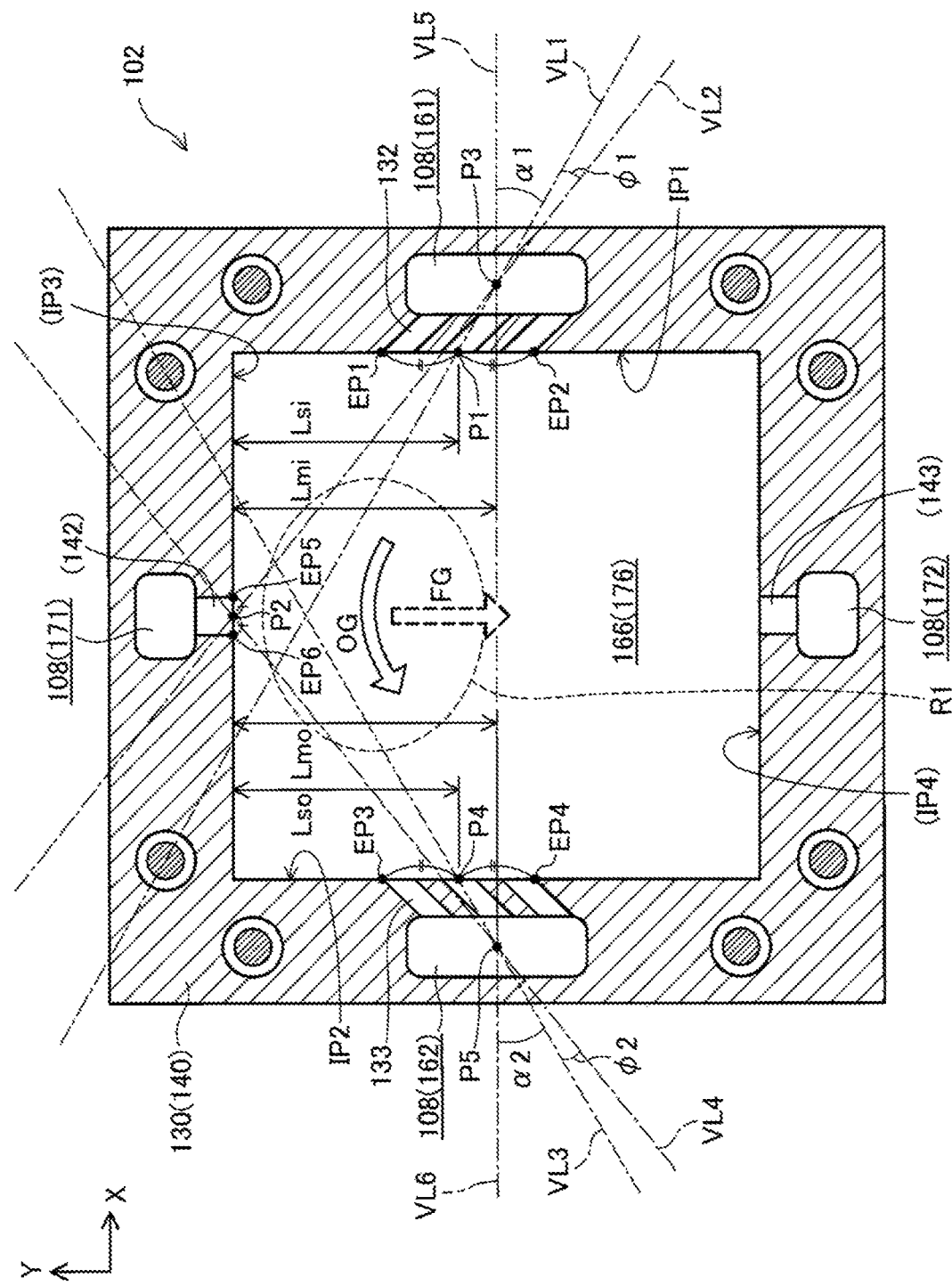
FIG. 8 is an XY cross-sectional view showing specific structures of flow channels formed in an electricity generation unit 102.

Next, specific structures of the channels formed in each electricity generation unit 102 will be described. FIG. 8 is an XY cross-sectional view showing the specific structures of the channels formed in one of the electricity generation units 102. For the sake of description, the channels formed in the anode-side frame 140 (the fuel gas supply communication channel 142 and the fuel gas discharge communication channel 143) are also shown in FIG. 8 in addition to the channels formed in the cathode-side frame 130 (the oxidant gas supply communication channels 132 and the oxidant gas discharge communication channels 133). In the actual structure, the fuel gas supply communication channel 142 and the fuel gas discharge communication channel 143 are not formed in the cathode-side frame 130, and the oxidant gas supply communication channels 132 and the oxidant gas discharge communication channels 133 are not formed in the anode-side frame 140, as described above.

As shown in FIG. 8, in each electricity generation unit 102 in the present embodiment, the oxidant gas supply communication channels 132, when viewed in the Z-axis direction, do not extend from one of the communication holes 108 that forms the oxidant gas introduction manifold 161 in a direction orthogonal to the first inner circumferential surface IP1 (to be precise, a straight portion of the portion of the contour of the hole 131 defined by the first inner circumferential surface IP1; hereinafter the term "first inner circumferential surface IP1" is appropriately used to express the straight portion) (i.e., do not extend in the X-axis direction). Instead, the oxidant gas supply communication channels 132 extend in a direction inclined toward the opening of the fuel gas supply communication channel 142 that is positioned at the third inner circumferential surface IP3 (i.e., toward the positive side in the Y-axis direction). In other words, in each electricity generation unit 102 in the present embodiment, a distance Lsi shown in FIG. 8 is shorter than a distance Lmi. The distance Lsi is the distance between a first point P1 and a second point P2 in a direction parallel to the first inner circumferential surface IP1 (i.e., the Y-axis direction). The first point P1 is the midpoint between opposite end points EP1 and EP2 of a cathode-side supply opening group including all the openings of the oxidant gas supply communication channels 132 at the first inner circumferential surface IP1. The second point P2 is the midpoint between opposite end points EP5 and EP6 of an anode-side supply opening group including the opening of the fuel gas supply communication channel 142 at the third inner circumferential surface IP3 (only one opening is provided in the present embodiment). The distance Lmi is the distance between the second point P2 and a third point P3 that is the centroid of the communication hole 108 forming the oxidant gas introduction manifold 161 in the above direction (the Y-axis direction). The condition that the distance Lsi is shorter than the distance Lmi corresponds to the first condition in the claims.

In the following description, the degree of inclination of the oxidant gas supply communication channels 132 is represented by a supply-side channel angle α1. The supply-side channel angle α1 is the angle between a virtual line passing through the third point P3 and orthogonal to the first inner circumferential surface IP1 (this line is hereinafter referred to as a "fifth virtual line VL5") and a virtual line connecting the third point P3 to the first point P1 (this line is hereinafter referred to as a "first virtual line VL1") when the electricity generation unit 102 is viewed in the Z-axis direction. The supply-side channel angle α1 takes a positive value when the oxidant gas supply communication channels 132 extending from the communication hole 108 forming the oxidant gas introduction manifold 161 are inclined toward the opening of the fuel gas supply communication channel 142. In the following description, the difference between a prescribed first reference direction and the extending direction of the oxidant gas supply communication channels 132 is represented by a supply-side differential angle ϕ1. The first reference direction is a direction from the communication hole 108 forming the oxidant gas introduction manifold 161 (more specifically, the third point P3, which is the centroid of this communication hole 108) toward the opening of the fuel gas supply communication channel 142 at the third inner circumferential surface IP3 (more specifically, the second point P2, which is the midpoint between the opposite end points EP5 and EP6 of the anode-side supply opening group including the opening of the fuel gas supply communication channel 142 at the third inner circumferential surface IP3). Specifically, the supply-side differential angle ϕ1 is the angle between the first virtual line VL1 and a virtual line connecting the third point P3 to the second point P2 (hereinafter referred to as a "second virtual line VL2"). The absolute value of the supply-side differential angle ϕ1 is used.

Similarly, in each electricity generation unit 102 in the present embodiment, the oxidant gas discharge communication channels 133, when viewed in the Z-axis direction, do not extend from one of the communication holes 108 that forms the oxidant gas discharge manifold 162 in a direction orthogonal to the second inner circumferential surface IP2 (to be precise, a straight portion of the portion of the contour of the hole 131 defined by the second inner circumferential surface IP2; hereinafter the term "second inner circumferential surface IP2" is appropriately used to express the straight portion) (i.e., do not extend in the X-axis direction). Instead, the oxidant gas discharge communication channels 133 extend in a direction inclined toward the opening of the fuel gas supply communication channel 142 at the third inner circumferential surface IP3 (i.e., toward the positive side in the Y-axis direction). In other words, in each electricity generation unit 102 in the present embodiment, a distance Lso shown in FIG. 8 is shorter than a distance Lmo. The distance Lso is the distance between a fourth point P4 and the second point P2 in a direction parallel to the second inner circumferential surface IP2 (i.e., the Y-axis direction). The fourth point P4 is the midpoint between opposite end points EP3 and EP4 of a cathode-side discharge opening group including all the openings of the oxidant gas discharge communication channels 133 at the second inner circumferential surface IP2. The distance Lmo is the distance between a fifth point P5 and the second point P2 in the above direction (the Y-axis direction). The fifth point P5 is the centroid of the communication hole 108 forming the oxidant gas discharge manifold 162. The condition that the distance Lso is shorter than the distance Lmo corresponds to the second condition in the claims.

In the following description, the degree of inclination of the oxidant gas discharge communication channels 133 is represented by a discharge-side channel angle α2. The discharge-side channel angle α2 is the angle between a virtual line passing through the fifth point P5 and orthogonal to the second inner circumferential surface IP2 (this line is hereinafter referred to as a "sixth virtual line VL6") and a virtual line connecting the fifth point P5 to the fourth point P4 (hereinafter referred to as a "third virtual line VL3") when the electricity generation unit 102 is viewed in the Z-axis direction. The discharge-side channel angle α2 takes a positive value when the oxidant gas discharge communication channels 133 extending from the communication hole 108 forming the oxidant gas discharge manifold 162 are inclined toward the opening of the fuel gas supply communication channel 142. In the following description, the difference between a prescribed second reference direction and the extending direction of the oxidant gas discharge communication channels 133 is represented by a discharge-side differential angle φ2. The second reference direction is a direction from the communication hole 108 forming the oxidant gas discharge manifold 162 (more specifically, the fifth point P5, which is the centroid of this communication hole 108) toward the opening of the fuel gas supply communication channel 142 at the third inner circumferential surface IP3 (more specifically, the second point P2, which is the midpoint between the opposite end points EP5 and EP6 of the anode-side supply opening group including the opening of the fuel gas supply communication channel 142 at the third inner circumferential surface IP3). Specifically, the discharge-side differential angle φ2 is the angle between the third virtual line VL3 and a virtual line connecting the fifth point P5 to the second point P2 (hereinafter referred to as a "fourth virtual line VL4"). The absolute value of the discharge-side differential angle φ2 is used.

A-4. Effects of Present Embodiment

As described above, each of the electricity generation units 102 included in the fuel cell stack 100 of the present embodiment includes the unit cell 110, the cathode-side frame 130, and the anode-side frame 140. The cathode-side frame 130 has: the hole 131 that forms the cathode chamber 166 to which the cathode 114 is facing and has the first inner circumferential surface IP1 and the second inner circumferential surface IP2 facing each other in the X-axis direction; the communication hole 108 forming the oxidant gas introduction manifold 161 through which the gas to be supplied to the cathode chamber 166 flows; the communication hole 108 forming the oxidant gas discharge manifold 162 through which the gas discharged from the cathode chamber 166 flows; at least one oxidant gas supply communication channel 132 that is in communication with the communication hole 108 forming the oxidant gas introduction manifold 161 and has an opening at the first inner circumferential surface IP1 of the hole 131; and at least one oxidant gas discharge communication channel 133 that is in communication with the communication hole 108 forming the oxidant gas discharge manifold 162 and has an opening at the second inner circumferential surface IP2 of the hole 131. The anode-side frame 140 has: the hole 141 that forms the anode chamber 176 to which the anode 116 is facing and has the third inner circumferential surface IP3; the communication hole 108 forming the fuel gas introduction manifold 171 through which the gas to be supplied to the anode chamber 176 flows; and at least one fuel gas supply communication channel 142 that is in communication with the communication hole 108 forming the fuel gas introduction manifold 171 and has an opening at the third inner circumferential surface IP3 of the hole 141. In the contour of the hole 131 when it is viewed in the Z-axis direction, the portion defined by the first inner circumferential surface IP1 includes a straight portion, and the portion defined by the second inner circumferential surface IP2 includes a straight portion. In each of the electricity generation units 102 included in the fuel cell stack 100 of the present embodiment, the distance Lsi between the first point P1 and the second point P2 in a direction parallel to the straight portion of the first inner circumferential surface IP1 (the Y-axis direction) is shorter than the distance Lmi between the second point P2 and the third point P3 in the above direction (the Y-axis direction). As described above, the first point P1 is the midpoint between the opposite end points EP1 and EP2 of the cathode-side supply opening group including all the openings of the oxidant gas supply communication channels 132 at the first inner circumferential surface IP1. The second point P2 is the midpoint between the opposite end points EP5 and EP6 of the anode-side supply opening group including the opening of the fuel gas supply communication channel 142 at the third inner circumferential surface IP3. The third point P3 is the centroid of the communication hole 108 forming the oxidant gas introduction manifold 161.

Since each of the electricity generation units 102 included in the fuel cell stack 100 of the present embodiment has the structure described above, a reduction in the power generation performance of the unit cell 110 due to shortage of the oxidant gas OG can be prevented as described below.

Generally, during operation of an SOFC, the amount of the fuel gas FG supplied tends to be smaller than the amount of the oxidant gas OG supplied, in order to improve the use efficiency of the fuel gas FG. Therefore, the power generation reaction occurs concentratedly in a region close to the opening of the fuel gas supply communication channel 142 (a region R1 in FIG. 8) within the unit cell 110, and a large amount of the oxidant gas OG is consumed in the region R1. In this case, when the distance Lsi is equal to the distance Lmi, i.e., when the oxidant gas supply communication channels 132 extend from the communication hole 108 forming the oxidant gas introduction manifold 161 in a direction orthogonal to the first inner circumferential surface IP1 (the X-axis direction) when viewed in the Z-axis direction, the oxidant gas OG is not sufficiently supplied to the region R1 in which the power generation reaction tends to occur concentratedly, and a shortage of the oxidant gas OG occurs in the region R1, causing a reduction in the power generation performance of the unit cell 110. When the distance Lsi is longer than the distance Lmi, i.e., when the oxidant gas supply communication channels 132 extend from the communication hole 108 forming the oxidant gas introduction manifold 161 in a direction inclined toward the opening of the fuel gas discharge communication channel 143 when viewed in the Z-axis direction, a further shortage of the oxidant gas OG occurs in the region R1, causing a significant reduction in the power generation performance of the unit cell 110.

In contrast, in each of the electricity generation units 102 included in the fuel cell stack 100 of the present embodiment, the distance Lsi is shorter than the distance Lmi. Specifically, the oxidant gas supply communication channels 132, when viewed in the Z-axis direction, extend from the communication hole 108 forming the oxidant gas introduction manifold 161 in a direction inclined toward the opening of the fuel gas supply communication channel 142 at the third inner circumferential surface IP3. In this structure, the supply of the oxidant gas OG to the region R1 in which the power generation reaction tends to occur concentratedly is facilitated, so that a shortage of the oxidant gas OG in the region R1 can be prevented. Therefore, in each of the electricity generation units 102 included in the fuel cell stack 100 of the present embodiment, a reduction in the power generation performance of the unit cell 110 due to shortage of the oxidant gas OG can be prevented.

In each of the electricity generation units 102 included in the fuel cell stack 100 of the present embodiment, the distance Lso between the fourth point P4 and the second point P2 in the direction parallel to the straight portion of the second inner circumferential surface IP2 (the Y-axis direction) is shorter than the distance Lmo between the fifth point P5 and the second point P2 in the above direction (the Y-axis direction). As described above, the fourth point P4 is the midpoint between the opposite end points EP3 and EP4 of the cathode-side discharge opening group including all the openings of the oxidant gas discharge communication channels 133 at the second inner circumferential surface IP2, and the fifth point P5 is the centroid of the communication hole 108 forming the oxidant gas discharge manifold 162. Specifically, the oxidant gas discharge communication channels 133, when viewed in the Z-axis direction, extend from the communication hole 108 forming the oxidant gas discharge manifold 162 in a direction inclined toward the opening of the fuel gas supply communication channel 142 at the third inner circumferential surface IP3. In this structure also, the supply of the oxidant gas OG to the region R1 in which the power generation reaction tends to occur concentratedly is facilitated, and a shortage of the oxidant gas OG in the region R1 can be prevented. Therefore, in each of the electricity generation units 102 included in the fuel cell stack 100 of the present embodiment, a reduction in the power generation performance of the unit cell 110 due to shortage of the oxidant gas OG can be prevented very effectively.

To facilitate the supply of the oxidant gas OG to the region R1 in which the power generation reaction tends to occur concentratedly, the position of the oxidant gas introduction manifold 161 and the position of the oxidant gas discharge manifold 162 may be adjusted (specifically, these may be disposed at positions near the opening of the fuel gas supply communication channel 142 at the third inner circumferential surface IP3). However, the design flexibility in terms of the positions of the manifolds 161 and 162 is low because, for example, interference between the manifolds 161 and 162 and the bolt holes 109 must be avoided. In the present embodiment, since the supply of the oxidant gas OG to the region R1 can be facilitated without adjusting the positions of the manifolds 161 and 162, a reduction in the power generation performance of the unit cell 110 can be effectively prevented while influences on other components are reduced as much as possible.

A-5. Performance Evaluation

Figure 9:
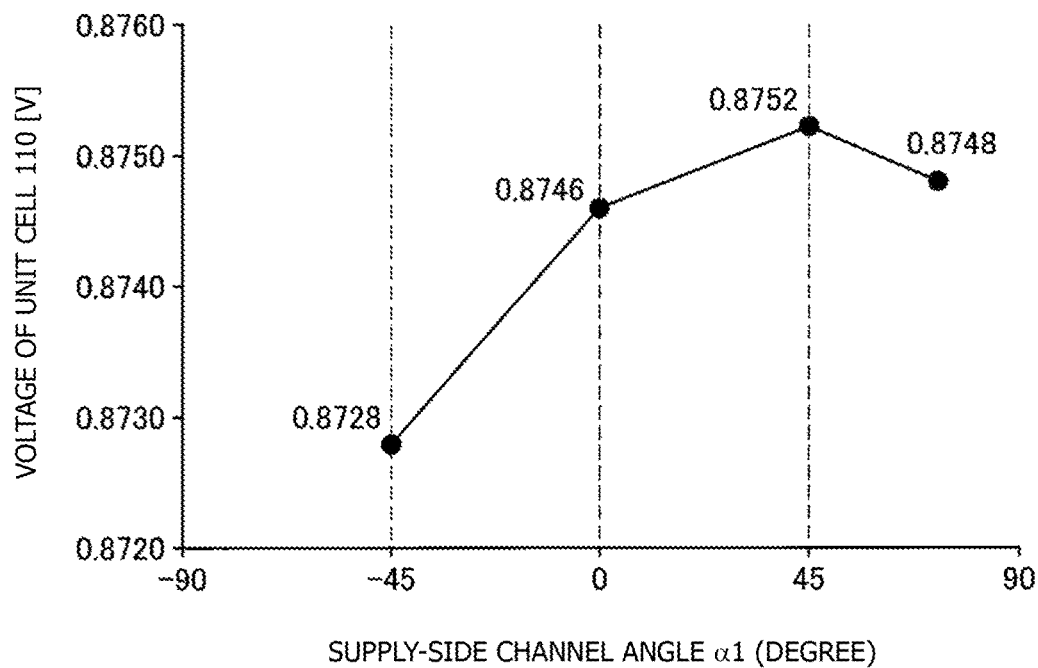
FIG. 9 is a graph illustrating the results of performance evaluation.
Figure 10:
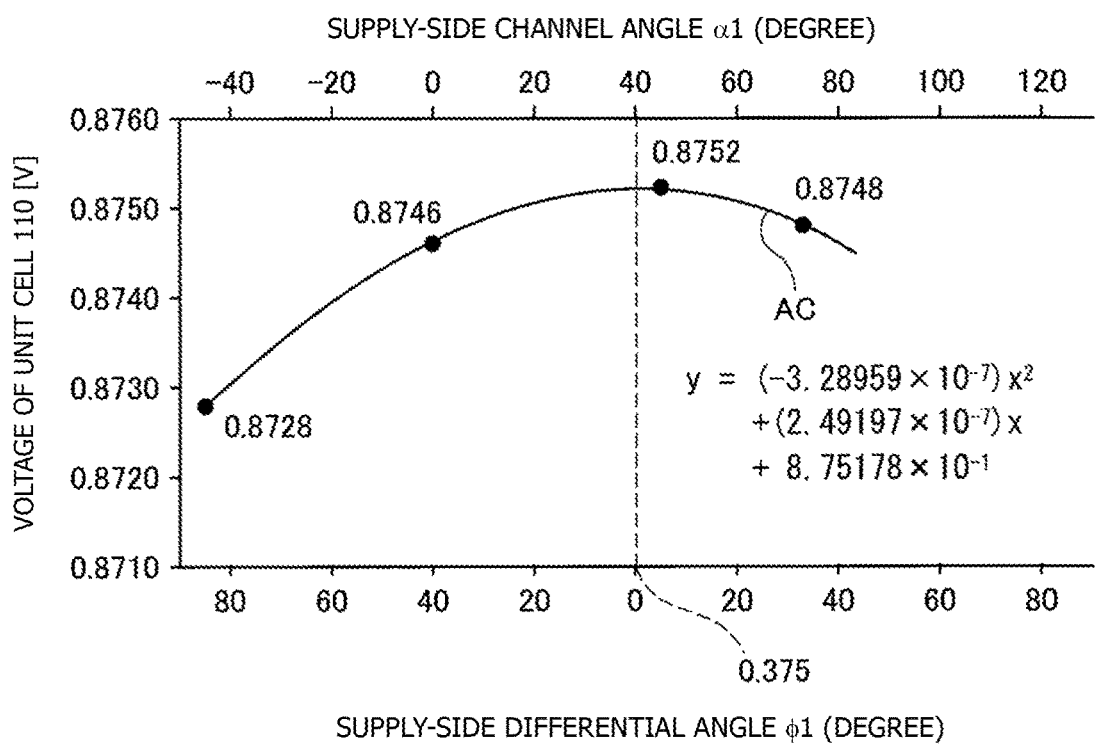
FIG. 10 is a graph illustrating the results of performance evaluation.
Figure 11:
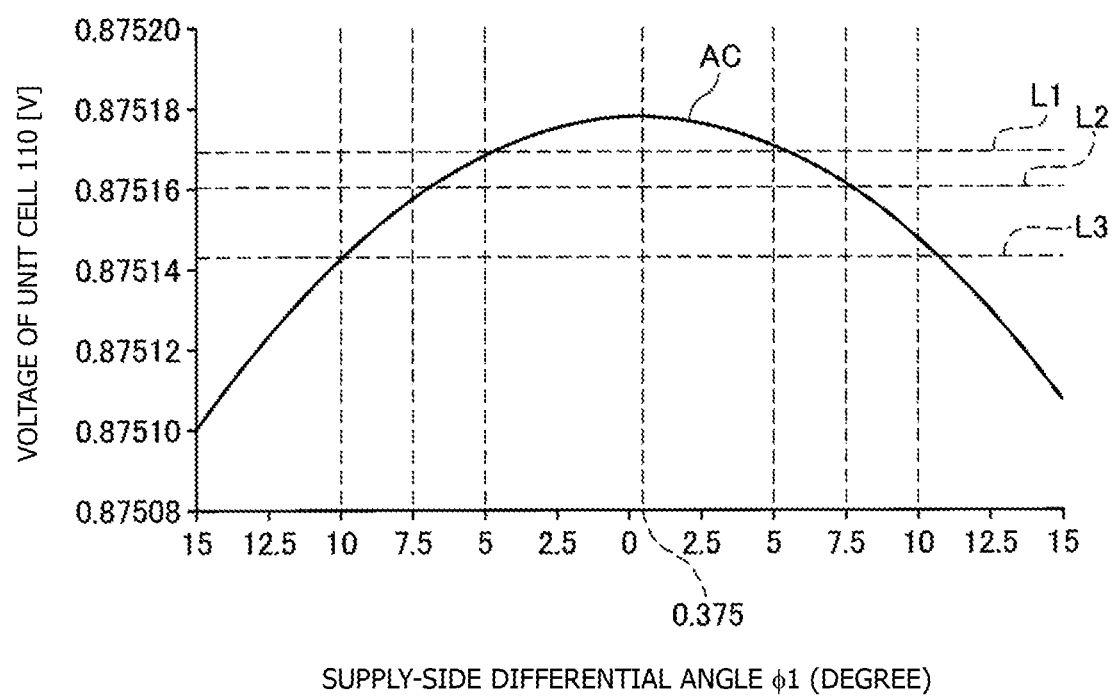
FIG. 11 is a graph illustrating the results of performance evaluation.

The relation between the power generation performance of the unit cell 110 and the structures of the channels (e.g., the inclinations of the channels) was determined by simulations to perform performance evaluation. FIGS. 9 to 11 are graphs showing the results of the performance evaluation. In the performance evaluation, fuel cell stacks 100 each including ten unit cells 110 (ten electricity generation units 102) having the above-described structure were produced such that the supply-side channel angle α1 in the unit cells 110 (the electricity generation units 102) differed among the fuel cell stacks 100. Each fuel cell stack 100 was operated at a temperature of 650° C. and a current density of 0.25 A/cm$^2$ to generate electricity, and a voltage per unit cell 110 was measured.

FIG. 9 shows the relation between the supply-side channel angle α1 and the voltage of the unit cell 110. As can be seen from the results of the performance evaluation shown in FIG. 9, the voltage of the unit cell 110 is high when the supply-side channel angle α1 is larger than 0°. As shown in FIG. 8, a supply-side channel angle α1 larger than 0° means that, when viewed in the Z-axis direction, the oxidant gas supply communication channels 132 extend from the communication hole 108 forming the oxidant gas introduction manifold 161 in a direction inclined toward the opening of the fuel gas supply communication channel 142 at the third inner circumferential surface IP3 (i.e., the distance Lsi is shorter than the distance Lmi). As can be seen from these results, by forming the oxidant gas supply communication channels 132 in each of the electricity generation units 102 such that the distance Lsi is shorter than the distance Lmi as described above, a reduction in the power generation performance of the unit cell 110 due to shortage of the oxidant gas OG can be prevented.

FIG. 10 shows the relation between the voltage of the unit cell 110 and the supply-side channel angle α1 and the relation between the voltage of the unit cell 110 and the supply-side differential angle φ1. Specifically, FIG. 10 shows an approximation curve AC determined from data at measurement points. As shown in FIG. 10, in the performance evaluation, the channels in the electricity generation units 102 are formed such that φ1 is 0° when the supply-side channel angle α1 is 40°. As can be seen from the results in FIGS. 9 and 10, when the supply-side channel angle α1 is excessively large (when the supply-side differential angle φ1 is excessively large), the voltage of the unit cell 110 decreases. This may be because of the following reason. When the supply-side channel angle α1 is excessively large, the in-plane concentration of the oxidant gas OG in the unit cell 110 is highly non-uniform, and the reactivity in a region in which the concentration of the oxidant gas OG is excessively low decreases extremely, so that the power generation performance of the unit cell 110 as a whole decreases.

As shown in FIG. 11, in this performance evaluation, when the supply-side differential angle φ1 is nearly 0° (to be precise, 0.375°) (i.e., the extending direction of the oxidant gas supply communication channels 132 approximately coincides with a direction from the communication hole 108 forming the oxidant gas introduction manifold 161 toward the opening of the fuel gas supply communication channel 142 at the third inner circumferential surface IP3), the voltage of the unit cell 110 in the approximation curve AC shown in FIG. 10 has the maximum value. Straight lines L1, L2, and L3 shown in FIG. 11 are a line representing a voltage value lower by 0.001% than the maximum voltage value in the approximation curve AC, a line representing a voltage value lower by 0.002%, and a line representing a voltage value lower by 0.004%, respectively. As can be seen from the results shown in FIG. 11, to prevent the reduction in the performance of the unit cell 110 more effectively, the supply-side differential angle φ1 is preferably 10° or less, more preferably 7.5° or less, and still more preferably 5° or less.

In the performance evaluation, the supply-side channel angle α1 (and the supply-side differential angle φ1) representing the degree of inclination of the oxidant gas supply communication channels 132 was used for the evaluation. It is expected that the same results are obtained when the discharge-side channel angle α2 (and the discharge-side differential angle ϕ2) representing the degree of inclination of the oxidant gas discharge communication channels 133 is used. Therefore, it can be said that, when the discharge-side channel angle α2 is larger than 0° (i.e., when the oxidant gas discharge communication channels 133, as viewed in the Z-axis direction, extend from the communication hole 108 forming the oxidant gas discharge manifold 162 in a direction inclined toward the opening of the fuel gas supply communication channel 142 at the third inner circumferential surface IP3 and the distance Lso is shorter than the distance Lmo), a reduction in the power generation performance of the unit cell 110 due to shortage of the oxidant gas OG can be prevented. To prevent the reduction in the performance of the unit cell 110 more effectively, the discharge-side differential angle ϕ2 is preferably 10° or less, more preferably 7.5° or less, and still more preferably 5° or less.

B. Modifications

The technique disclosed in the present description is not limited to the embodiment described above and may be modified into various forms without departing from the scope of the invention. For example, the following modifications are possible.

Figure 12:
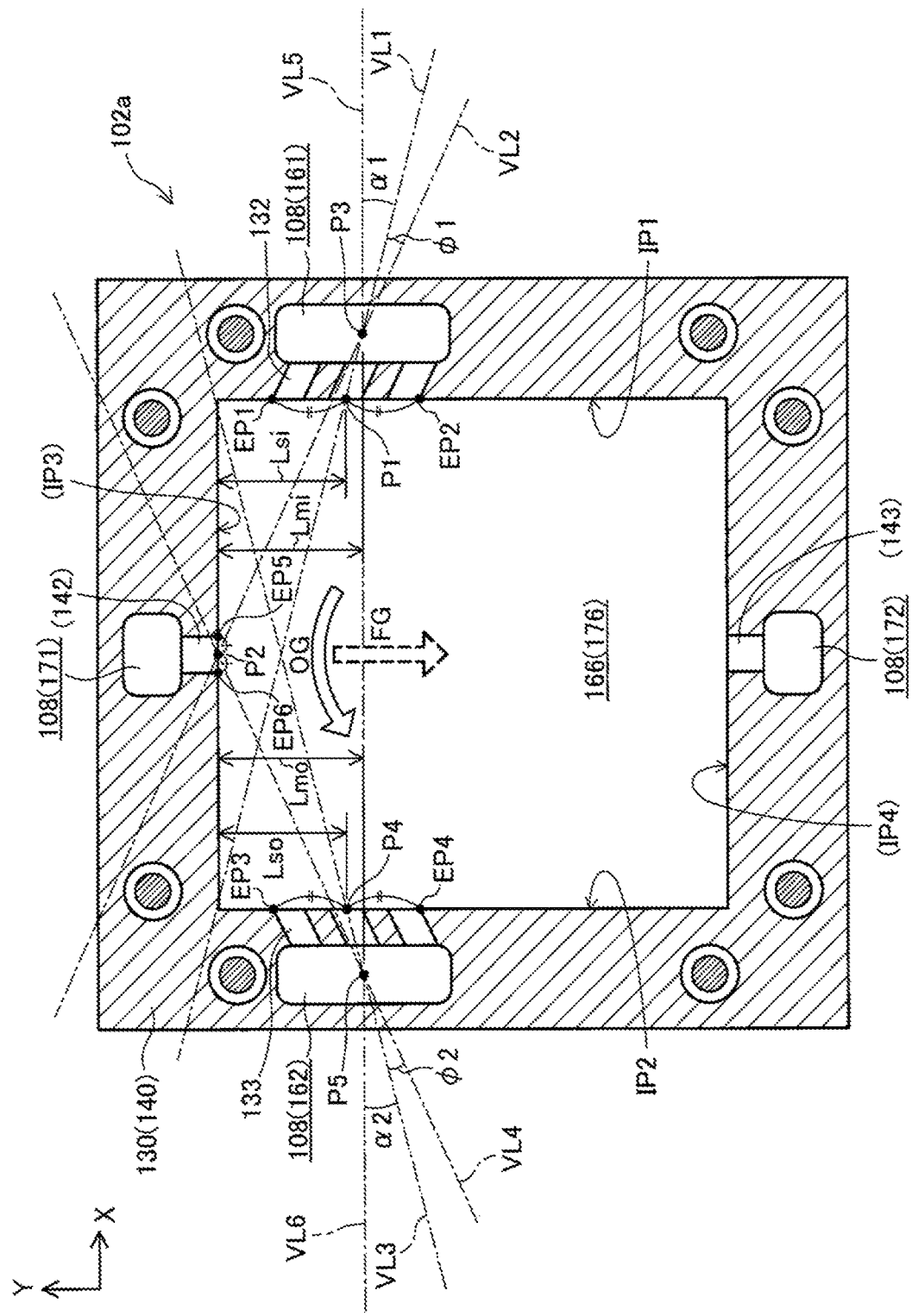
FIG. 12 is an XY cross-sectional view showing specific structures of flow channels formed in an electricity generation unit 102a in a first modification.

FIG. 12 is an XY cross-sectional view showing specific structures of flow channels formed in an electricity generation unit 102a in a first modification. In the electricity generation unit 102a in the first modification shown in FIG. 12, the oxidant gas introduction manifold 161 and the oxidant gas discharge manifold 162 are disposed at positions closer to the fuel gas supply communication channel 142 than those in the electricity generation unit 102 in the above embodiment shown in FIG. 8, etc. (i.e., the oxidant gas introduction manifold 161 and the oxidant gas discharge manifold 162 are offset toward the positive side in the Y-axis direction).

In the electricity generation unit 102a in the first modification shown in FIG. 12, as in the electricity generation unit 102 in the above embodiment shown in FIG. 8, etc., the oxidant gas supply communication channels 132, when viewed in the Z-axis direction, do not extend from the communication hole 108 forming the oxidant gas introduction manifold 161 in a direction orthogonal to the first inner circumferential surface IP1 (i.e., in the X-axis direction) but extend in a direction inclined toward the opening of the fuel gas supply communication channel 142 at the third inner circumferential surface IP3. In other words, the distance Lsi is shorter than the distance Lmi. In the electricity generation unit 102a in the first modification shown in FIG. 12, since the oxidant gas introduction manifold 161 is disposed at a position closer to the fuel gas supply communication channel 142, the degree of inclination of the oxidant gas supply communication channels 132 (the supply-side channel angle α1) is smaller than that in the electricity generation unit 102 in the above embodiment shown in FIG. 8, etc.

Similarly, in the electricity generation unit 102a in the first modification shown in FIG. 12, the oxidant gas discharge communication channels 133, when viewed in the Z-axis direction, do not extend from the communication hole 108 forming the oxidant gas discharge manifold 162 in a direction orthogonal to the second inner circumferential surface IP2 (i.e., in the X-axis direction) but extend in a direction inclined toward the opening of the fuel gas supply communication channel 142 at the third inner circumferential surface IP3. In other words, the distance Lso is shorter than the distance Lmo.

Since the electricity generation unit 102a in the first modification shown in FIG. 12 has the structure described above, a reduction in the power generation performance of the unit cell 110 due to shortage of the oxidant gas OG can be prevented, as in the electricity generation unit 102 in the above embodiment shown in FIG. 8, etc. To prevent the reduction in the performance of the unit cell 110 more effectively, the supply-side differential angle ϕ1 and the discharge-side differential angle ϕ2 are preferably 10° or less, more preferably 7.5° or less, and still more preferably 5° or less.

Figure 13:
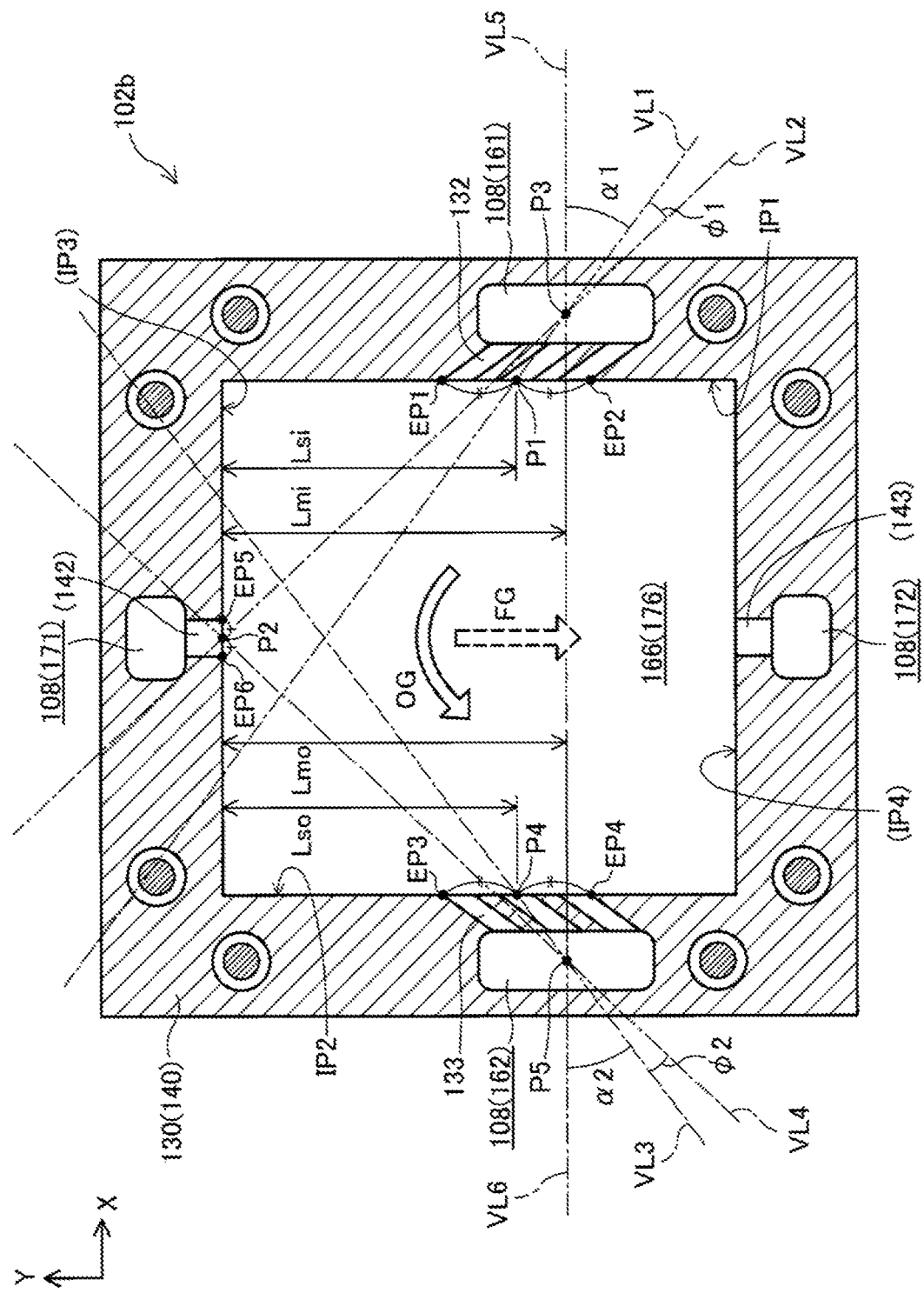
FIG. 13 is an XY cross-sectional view showing specific structures of flow channels formed in an electricity generation unit 102b in a second modification.

FIG. 13 is an XY cross-sectional view showing specific structures of flow channels formed in an electricity generation unit 102b in a second modification. In the electricity generation unit 102b in the second modification shown in FIG. 13, the oxidant gas introduction manifold 161 and the oxidant gas discharge manifold 162 are disposed at positions farther from the fuel gas supply communication channel 142 than those in the electricity generation unit 102 in the above embodiment shown in FIG. 8, etc. (i.e., the oxidant gas introduction manifold 161 and the oxidant gas discharge manifold 162 are offset toward the negative side in the Y-axis direction).

In the electricity generation unit 102b in the second modification shown in FIG. 13, as in the electricity generation unit 102 in the above embodiment shown in FIG. 8, etc., the oxidant gas supply communication channels 132, when viewed in the Z-axis direction, do not extend from the communication hole 108 forming the oxidant gas introduction manifold 161 in a direction orthogonal to the first inner circumferential surface IP1 (i.e., the X-axis direction) but extend in a direction inclined toward the opening of the fuel gas supply communication channel 142 at the third inner circumferential surface IP3. In other words, the distance Lsi is shorter than the distance Lmi. In the electricity generation unit 102b in the second modification shown in FIG. 13, since the oxidant gas introduction manifold 161 is disposed at a position farther from the fuel gas supply communication channel 142, the degree of inclination of the oxidant gas supply communication channels 132 (the supply-side channel angle α1) is larger than that in the electricity generation unit 102 in the above embodiment shown in FIG. 8, etc.

Similarly, in the electricity generation unit 102b in the second modification shown in FIG. 13, the oxidant gas discharge communication channels 133, when viewed in the Z-axis direction, do not extend from the communication hole 108 forming the oxidant gas discharge manifold 162 in a direction orthogonal to the second inner circumferential surface IP2 (i.e., the X-axis direction) but extend in a direction inclined toward the opening of the fuel gas supply communication channel 142 at the third inner circumferential surface IP3. In other words, the distance Lso is shorter than the distance Lmo.

Since the electricity generation unit 102b in the second modification shown in FIG. 13 has the structure described above, a reduction in the power generation performance of the unit cell 110 due to shortage of the oxidant gas OG can be prevented, as in the electricity generation unit 102 in the above embodiment shown in FIG. 8 etc. To prevent the reduction in the performance of the unit cell 110 more effectively, the supply-side differential angle ϕ1 and the discharge-side differential angle ϕ2 are preferably 10° or less, more preferably 7.5° or less, and still more preferably 5° or less.

Figure 14:
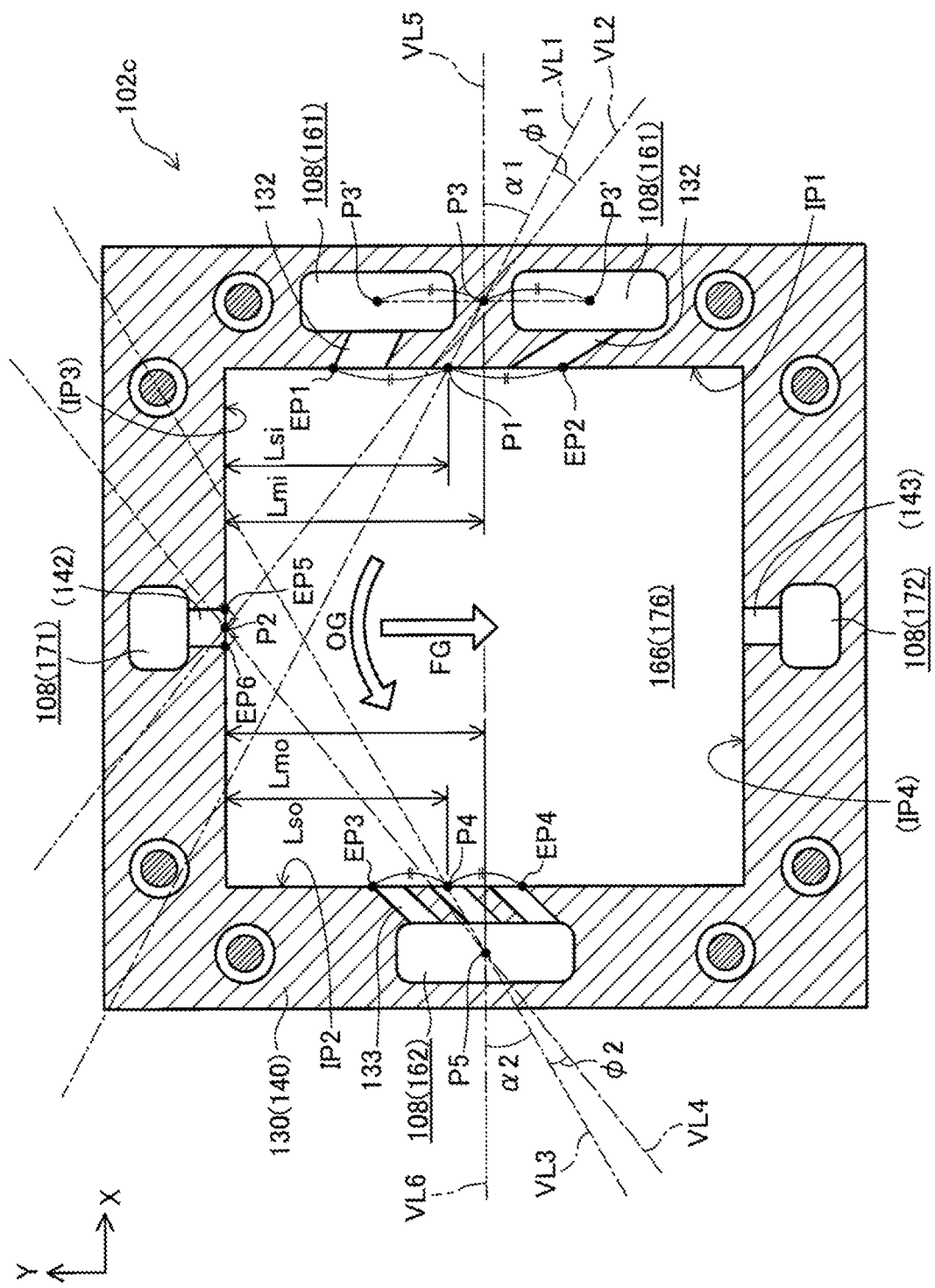
FIG. 14 is an XY cross-sectional view showing specific structures of flow channels formed in an electricity generation unit 102c in a third modification.

FIG. 14 is an XY cross-sectional view showing specific structures of flow channels formed in an electricity generation unit 102c in a third modification. In the electricity generation unit 102c in the third modification shown in FIG. 14, two oxidant gas introduction manifolds 161 are provided, and oxidant gas supply communication channels 132 extend from their respective communication holes 108 forming the oxidant gas introduction manifolds 161 toward the cathode chamber 166.

In the electricity generation unit 102c in the third modification shown in FIG. 14, as in the electrical generation unit 102 in the above embodiment shown in FIG. 8, etc., oxidant gas supply communication channels 132 for the communication holes 108 forming the two oxidant gas introduction manifolds 161, when viewed in the Z-axis direction, do not extend from the communication holes 108 forming the oxidant gas introduction manifolds 161 in a direction orthogonal to the first inner circumferential surface IP1 (i.e., the X-axis direction) but extend in a direction inclined toward the opening of the fuel gas supply communication channel 142 at the third inner circumferential surface IP3. In other words, the distance Lsi is shorter than the distance Lmi. When a plurality of communication holes 108 forming a plurality of oxidant gas introduction manifolds 161 are formed as in the present modification, the midpoint of a line segment connecting the centroids of communication holes 108 located at opposite ends among the plurality of communication holes 108 (the centroid P3' of the two communication holes 108 in the example shown in FIG. 14) is used as the third point P3, i.e., the centroid of the plurality of communication holes 108 forming the oxidant gas introduction manifolds 161. When the plurality of communication holes 108 forming the oxidant gas introduction manifolds 161 are formed, the midpoint between opposite end points EP1 and EP2 of a cathode-side supply opening group including all the openings of the oxidant gas supply communication channels 132 extending from the plurality of communication holes 108 is used as the first point P1. One of the two oxidant gas introduction manifolds 161 that is located on the positive side in the Y-axis direction is disposed at a position closer to the fuel gas supply communication channel 142, and therefore the degree of inclination (the supply-side channel angle α1) of the oxidant gas supply communication channel 132 extending from the communication hole 108 forming this oxidant gas introduction manifold 161 is small. The other one of the two oxidant gas introduction manifolds 161 that is located on the negative side in the Y-axis direction is disposed at position farther from the fuel gas supply communication channel 142, and therefore the degree of inclination (the supply-side channel angle α1) of the oxidant gas supply communication channel 132 extending from the communication hole 108 forming this oxidant gas introduction manifold 161 is large.

In the electricity generation unit 102c in the third modification shown in FIG. 14, as in the electricity generation unit 102 in the above embodiment shown in FIG. 8, etc., only one oxidant gas discharge manifold 162 is provided. The oxidant gas discharge communication channels 133, when viewed in the Z-axis direction, do not extend from the communication hole 108 forming the oxidant gas discharge manifold 162 in a direction orthogonal to the second inner circumferential surface IP2 (i.e., the X-axis direction) but extend in a direction toward the opening of the fuel gas supply communication channel 142 at the third inner circumferential surface IP3. In other words, the distance Lso is shorter than the distance Lmo.

Since the electricity generation unit 102c in the third modification shown in FIG. 14 has the structure described above, a reduction in the power generation performance of the unit cell 110 due to shortage of the oxidant gas OG can be prevented, as in the electricity generation unit 102 in the above embodiment shown in FIG. 8, etc. To prevent the reduction in the performance of the unit cell 110 more effectively, the supply-side differential angle ϕ1 and the discharge-side differential angle ϕ2 are preferably 10° or less, more preferably 7.5° or less, and still more preferably 5° or less.

Figure 15:
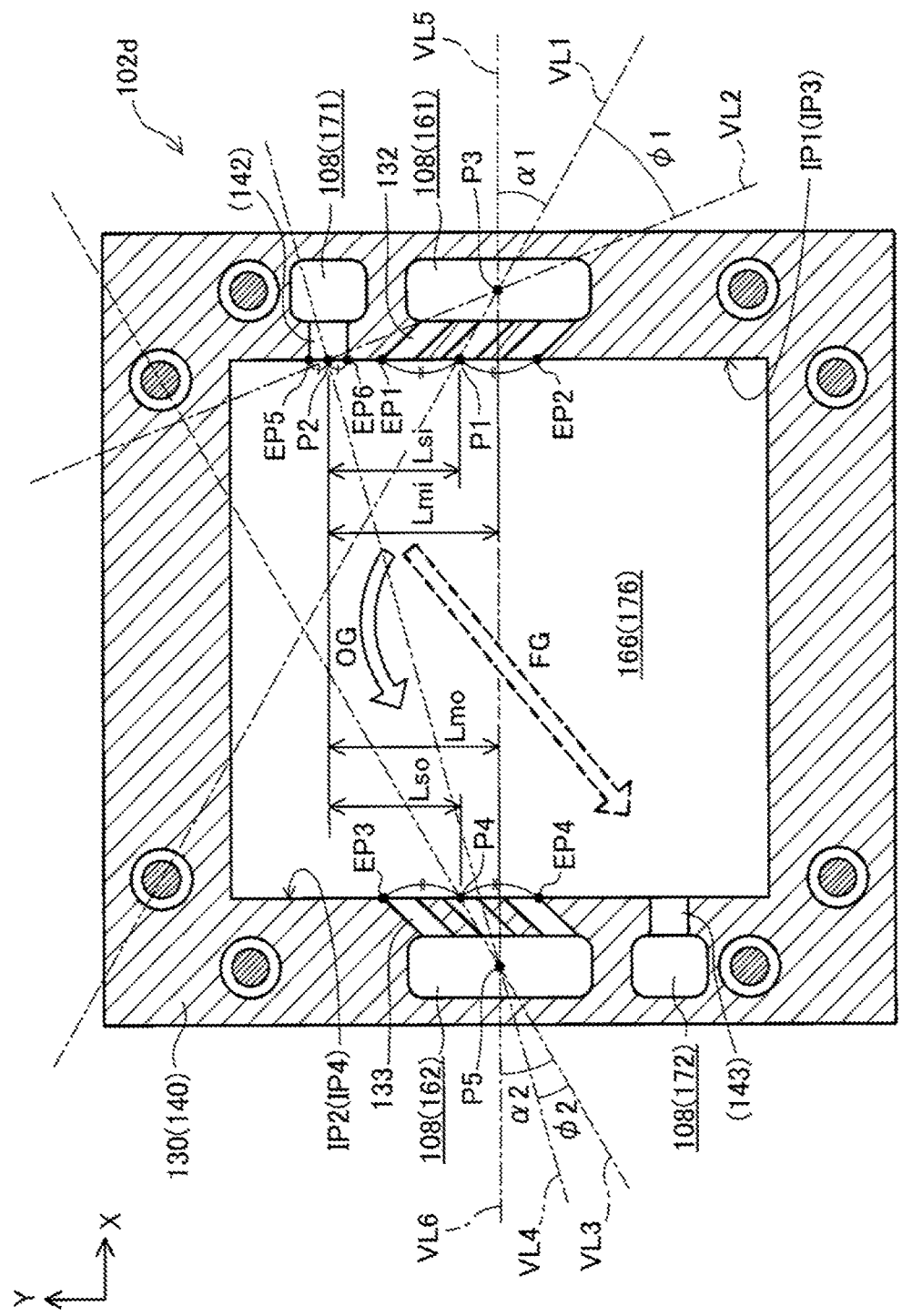
FIG. 15 is an XY cross-sectional view showing specific structures of flow channels formed in an electricity generation unit 102d in a fourth modification.

FIG. 15 is an XY cross-sectional view showing specific structures of flow channels formed in an electricity generation unit 102d in a fourth modification. In the electricity generation unit 102d in the fourth modification shown in FIG. 15, the fuel gas introduction manifold 171 and the oxidant gas introduction manifold 161 are disposed near one of the four peripheral sides, about the Z-axis direction, of the electricity generation unit 102d, and the fuel gas discharge manifold 172 and the oxidant gas discharge manifold 162 are disposed near another one of the four peripheral sides, about the Z-axis direction, of the electricity generation unit 102d. Specifically, the electricity generation unit 102d in the fourth modification shown in FIG. 15 is a co-flow-type SOFC in which the direction of the flow of the oxidant gas OG in the electricity generation unit 102d is approximately the same as the direction of the flow of the fuel gas FG in the electricity generation unit 102d.

In the electricity generation unit 102d in the fourth modification shown in FIG. 15, as in the electricity generation unit 102 in the above embodiment shown in FIG. 8, etc., the oxidant gas supply communication channels 132, when viewed in the Z-axis direction, do not extend from the communication hole 108 forming the oxidant gas introduction manifold 161 in a direction orthogonal to the first inner circumferential surface IP1 (i.e., the X-axis direction) but extend in a direction inclined toward the opening of the fuel gas supply communication channel 142 at the third inner circumferential surface IP3. In other words, the distance Lsi is shorter than the distance Lmi.

Similarly, in the electricity generation unit 102d in the fourth modification shown in FIG. 15, the oxidant gas discharge communication channels 133, when viewed in the Z-axis direction, do not extend from the communication hole 108 forming the oxidant gas discharge manifold 162 in a direction orthogonal to the second inner circumferential surface IP2 (i.e., the X-axis direction) but extend in a direction inclined toward the opening of the fuel gas supply communication channel 142 at the third inner circumferential surface IP3. In other words, the distance Lso is shorter than the distance Lmo.

Since the electricity generation unit 102d in the fourth modification shown in FIG. 15 has the structure described above, a reduction in the power generation performance of the unit cell 110 due to shortage of the oxidant gas OG can be prevented, as in the electricity generation unit 102 in the above embodiment shown in FIG. 8, etc. To prevent the reduction in the performance of the unit cell 110 more effectively, the supply-side differential angle ϕ1 and the discharge-side differential angle ϕ2 are preferably 10° or less, more preferably 7.5° or less, and still more preferably 5° or less.

Figure 16:
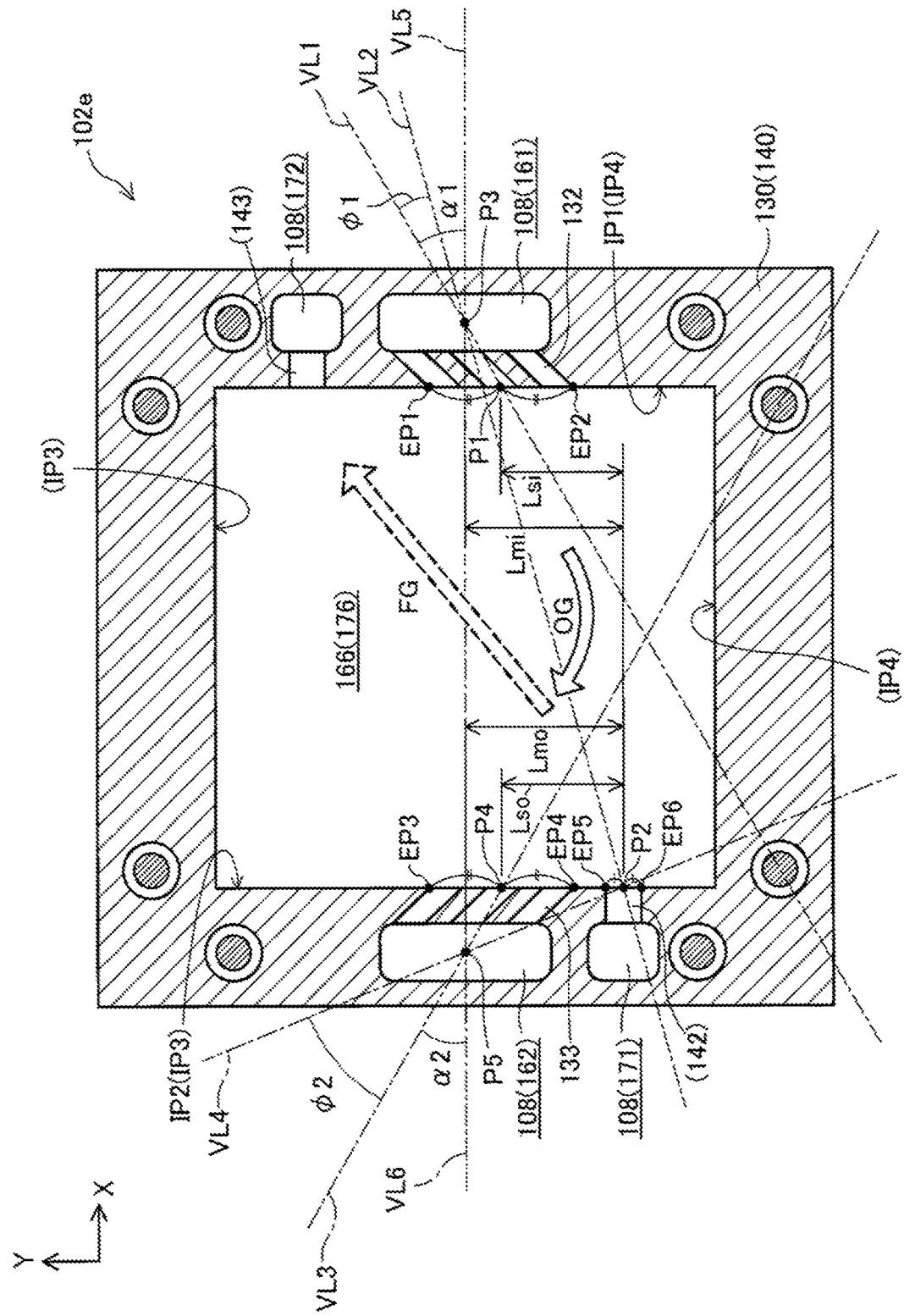
FIG. 16 is an XY cross-sectional view showing specific structures of flow channels formed in an electricity generation unit 102e in a fifth modification.

FIG. 16 is an XY cross-sectional view showing specific structures of flow channels in an electricity generation unit 102e in a fifth modification. In the electricity generation unit 102e in the fifth modification shown in FIG. 16, the fuel gas introduction manifold 171 and the oxidant gas discharge manifold 162 are disposed near one of the four peripheral sides, about the Z-axis direction, of the electricity generation unit 102e, and the fuel gas discharge manifold 172 and the oxidant gas introduction manifold 161 are disposed near another one of the four peripheral sides, about the Z-axis direction, of the electricity generation unit 102e. Specifically, the electricity generation unit 102e in the fifth modification shown in FIG. 16 is a counter flow-type SOFC in which the direction of the flow of the oxidant gas OG in the electricity generation unit 102e is approximately opposite to the direction of the flow of the fuel gas FG in the electricity generation unit 102e.

In the electricity generation unit 102e in the fifth modification shown in FIG. 16, as in the electricity generation unit 102 in the above embodiment shown in FIG. 8, etc., the oxidant gas supply communication channels 132, when viewed in the Z-axis direction, do not extend from the communication hole 108 forming the oxidant gas introduction manifold 161 in a direction orthogonal to the first inner circumferential surface IP1 (i.e., the X-axis direction) but extend in a direction inclined toward the opening of the fuel gas supply communication channel 142 at the third inner circumferential surface IP3. In other words, the distance Lsi is shorter than the distance Lmi.

Similarly, in the electricity generation unit 102e in the fifth modification shown in FIG. 16, the oxidant gas discharge communication channels 133, when viewed in the Z-axis direction, do not extend from the communication hole 108 forming the oxidant gas discharge manifold 162 in a direction orthogonal to the second inner circumferential surface IP2 (i.e., the X-axis direction) but extend in a direction inclined toward the opening of the fuel gas supply communication channel 142 at the third inner circumferential surface IP3. In other words, the distance Lso is shorter than the distance Lmo.

Since the electricity generation unit 102e in the fifth modification shown in FIG. 16 has the structure described above, a reduction in the power generation performance of the unit cell 110 due to shortage of the oxidant gas OG can be prevented, as in the electricity generation unit 102 in the above embodiment shown in FIG. 8, etc. To prevent the reduction in the performance of the unit cell 110 more effectively, the supply-side differential angle $\phi 1$ and the discharge-side differential angle $\phi 2$ are preferably 10° or less, more preferably 7.5° or less, and still more preferably 5° or less.

Each of the electricity generation units 102 in the above embodiment (and the modifications, the same applies to the following) satisfies the condition for the oxidant gas supply communication channels 132, i.e., the condition that the distance Lsi is shorter than the distance Lmi (the first condition), and the condition for the oxidant gas discharge communication channels 133, i.e., the condition that the distance Lso is shorter than the distance Lmo (the second condition). However, it is not always necessary that each electricity generation unit 102 satisfies both the two conditions. When each electricity generation unit 102 satisfies at least one of the two conditions, the structure that satisfies the at least one condition (the structure on the oxidant gas supply communication channel 132 side or the oxidant gas discharge communication channel 133 side) facilitates the supply of the oxidant gas OG to the region (the region R1) in which the power generation reaction tends to occur concentratedly, so that a reduction in the power generation performance of the unit cell 110 due to shortage of the oxidant gas OG can be prevented. However, when each electricity generation unit 102 satisfies both the two conditions, the supply of the oxidant gas OG to the region (the region R1) in which the power generation reaction tends to occur concentratedly is facilitated extremely effectively, so that the reduction in the power generation performance of the unit cell 110 due to shortage of the oxidant gas OG can be prevented extremely effectively.

In the above embodiment, it is not always necessary that all the electricity generation units 102 included in the fuel cell stack 100 satisfy at least one of the two conditions. When at least one of the electricity generation units 102 included in the fuel cell stack 100 satisfies at least one of the two conditions, the reduction in the power generation performance of the unit cell 110 due to shortage of the oxidant gas OG can be prevented extremely effectively in the at least one of the electricity generation units 102.

In each of the electricity generation units 102 in the above embodiment, one or both of the supply-side differential angle $\phi 1$ and the discharge-side differential angle $\phi 2$ may exceed 10°. However, as described above, it is preferable that the supply-side differential angle $\phi 1$ and/or the discharge-side differential angle $\phi 2$ is 10° or less because the reduction in the performance of the unit cell 110 can be prevented effectively.

In each electricity generation unit 102 in the above embodiment, when the hole 131 is viewed in the Z-axis direction, a portion defined by the first inner circumferential surface IP1 in the contour of the hole 131 and a portion defined by the second inner circumferential surface IP2 in the contour are entirely straight. However, the portion defined by the first inner circumferential surface IP1 and/or the portion defined by the second inner circumferential surface IP2 may be partially straight. In such a structure, the straight portion corresponds to the first straight portion or the second straight portion in the claims.

The structure of the fuel cell stack 100 or the electricity generation units 102 in the above embodiment is merely an example and can be modified variously. For example, in the above embodiment, the bolt holes 109 provided are independent of the communication holes 108 for the manifolds. However, the independent bolt holes 109 may be omitted, and the communication holes 108 for the manifolds may be used also as bolt holes. In the above embodiment, an intermediate layer may be disposed between the cathode 114 and the electrolyte layer 112. In the above embodiment, the number of electricity generation units 102 included in the fuel cell stack 100 is merely an example. The number of electricity generation units 102 is determined as appropriate according to the required output voltage of the fuel cell stack 100, etc. The materials forming the components in the above embodiment are merely examples, and other materials may be used to form these components.

The above embodiment relates to the SOFC that generates electricity by utilizing the electrochemical reaction of hydrogen contained in the fuel gas with oxygen contained in the oxidant gas. However, the present invention is also applicable to an electrolysis cell unit that is a structural unit of a solid oxide electrolysis cell (SOEC) that generates hydrogen by utilizing an electrolysis reaction of water and to an electrolysis cell stack including a plurality of electrolysis cell units. The structure of the electrolysis cell stack is well-known and described in, for example, Japanese Patent Application Laid-Open (kokai) No. 2016-81813, and therefore the detailed description thereof will be omitted. The structure of the electrolysis cell stack is generally the same as the structure of the fuel cell stack 100 of the above embodiment. Specifically, the fuel cell stack 100 of the above embodiment is read as an electrolysis cell stack, and the electricity generation unit 102 is read as an electrolysis cell unit. Moreover, the unit cell 110 is read as an electrolysis unit cell. However, during operation of the electrolysis cell stack, a voltage is applied between the cathode 114 and the anode 116 such that the cathode 114 serves as a positive electrode (anode) and the anode 116 serves as a negative electrode (cathode), and water vapor is supplied as a raw material gas through the communication holes 108. Electrolysis of water occurs in each of the electrolysis cell units. In this case, hydrogen gas is generated in the anode chamber 176, and the hydrogen is discharged to the outside of the electrolysis cell stack through the communication holes 108. Even in the electrolysis cell unit having the structure described above and the electrolysis cell stack having the structure described above, when at least one of the condition that the distance Lsi is shorter than the distance Lmi (the first condition) and the condition that the distance Lso is shorter than the distance Lmo (the second condition) is satisfied, a reduction in the reaction performance of the electrolysis unit cell due to shortage of the gas supplied to the cathode can be prevented, as in the above embodiment.

In the above embodiment, the solid oxide fuel cell (SOFC) has been described as an example. However, the present invention is applicable to fuel cells (or electrolysis cells) of other types such as molten carbonate fuel cells (MCFCs).

DESCRIPTION OF REFERENCE NUMERALS

22: bolt, 26: insulating sheet, 27: gas passage member, 28: main body, 29: branched portion, 100: fuel cell stack, 102: fuel cell electricity generation unit, 104: end plate, 106: end plate, 107: channel through hole, 108: communication hole, 109: bolt hole, 110: unit cell, 112: electrolyte layer, 114: cathode, 116: anode, 120: separator, 121: hole, 124: bonding member, 130: cathode-side frame, 131: hole, 132: oxidant gas supply communication hole, 133: oxidant gas discharge communication channel, 134: cathode-side current collector, 135: current collector element, 140: anode-side frame, 141: hole, 142: fuel gas supply communication channel, 143: fuel gas discharge communication channel, 144: anode-side current collector, 145: electrode-facing portion, 146: interconnector-facing portion, 147: connecting portion, 149: spacer, 150: interconnector, 161: oxidant gas introduction manifold, 162: oxidant gas discharge manifold, 166: cathode chamber, 171: fuel gas introduction manifold, 172: fuel gas discharge manifold, 176: anode chamber

The invention claimed is:
1. An electrochemical reaction unit comprising:
a unit cell including an electrolyte layer and further including a cathode and an anode that face each other in a first direction with the electrolyte layer therebetween;
a cathode-side member having a cathode chamber hole that forms a cathode chamber to which the cathode is facing and that has a first inner circumferential surface and a second inner circumferential surface facing each other in a second direction orthogonal to the first direction, a cathode-side gas supply channel hole that forms a cathode-side gas supply channel through which gas to be supplied to the cathode chamber flows, a cathode-side gas discharge channel hole that forms a cathode-side gas discharge channel through which gas discharged from the cathode chamber flows, at least one cathode-side supply communication channel that is in communication with the cathode-side gas supply channel hole and has an opening at the first inner circumferential surface of the cathode chamber hole, and at least one cathode-side discharge communication channel that is in communication with the cathode-side gas discharge channel hole and has an opening at the second inner circumferential surface of the cathode chamber hole; and
an anode-side member having an anode chamber hole that has a third inner circumferential surface and forms an anode chamber to which the anode is facing, an anode-side gas supply channel hole that forms an anode-side gas supply channel through which gas to be supplied to the anode chamber flows, and at least one anode-side supply communication channel that is in communication with the anode-side gas supply channel hole and has an opening at the third inner circumferential surface of the anode chamber hole,
wherein the electrochemical reaction unit satisfies a first condition and a second condition,
the first condition being that, when the electrochemical reaction unit is viewed in the first direction, a distance Lsi between a first point and a second point in a direction parallel to the first inner circumferential surface is shorter than a distance Lmi between the second point and a third point in the direction parallel to the first inner circumferential surface, the first point being the midpoint between opposite end points of a cathode-side supply opening group including the opening of the at least one cathode-side supply communication channel at the first inner circumferential surface, the second point being the midpoint between opposite end points of an anode-side supply opening group including the opening of the at least one anode-side supply communication channel at the third inner circumferential surface, the third point being the centroid of the cathode-side gas supply channel hole, and
the second condition being that, when the electrochemical reaction unit is viewed in the first direction, a distance Lso between the second point and a fourth point in a direction parallel to the second inner circumferential surface is shorter than a distance Lmo between the second point and a fifth point in the direction parallel to the second inner circumferential surface, the fourth point being the midpoint between opposite end points of a cathode-side discharge opening group including the opening of the at least one cathode-side discharge communication channel at the second inner circumferential surface, the fifth point being the centroid of the cathode-side gas discharge channel hole,
wherein the electrochemical reaction unit satisfies at least one of a third condition and a fourth condition,
the third condition being that, when the electrochemical reaction unit is viewed in the first direction, the angle between a first virtual line connecting the first point to the third point and a second virtual line connecting the second point to the third point is 10° or less, and
the fourth condition being that, when the electrochemical reaction unit is viewed in the first direction, the angle between a third virtual line connecting the fourth point to the fifth point and a fourth virtual line connecting the second point to the fifth point is 10° or less,
wherein the first inner circumferential surface and the second inner circumferential surface are perpendicular to the second direction.

2. An electrochemical reaction unit according to claim 1, wherein the electrochemical reaction unit satisfies both the third condition and the fourth condition.

3. An electrochemical reaction unit according to claim 1, wherein the unit cell is a fuel cell unit cell.

4. An electrochemical reaction cell stack comprising a plurality of electrochemical reaction units arranged in the first direction,
   wherein at least one of the plurality of electrochemical reaction units is the electrochemical reaction unit according to claim 1.

\* \* \* \* \*